US006900799B2

(12) United States Patent
Takeuchi

(10) Patent No.: US 6,900,799 B2
(45) Date of Patent: May 31, 2005

(54) FILTERING PROCESSING ON SCENE IN VIRTUAL 3-D SPACE

(75) Inventor: Hisahiko Takeuchi, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 555 days.

(21) Appl. No.: 09/833,613

(22) Filed: Apr. 13, 2001

(65) Prior Publication Data

US 2002/0082081 A1 Jun. 27, 2002

(30) Foreign Application Priority Data

Dec. 22, 2000 (JP) ........................................ 2000-391493

(51) Int. Cl.[7] ................................................ G06T 15/00

(52) U.S. Cl. ........................ 345/419; 345/592; 345/422; 463/32

(58) Field of Search ................................ 345/419, 422, 345/592; 463/32

(56) References Cited

U.S. PATENT DOCUMENTS

| | | | |
|---|---|---|---|
| 5,856,829 | A | 1/1999 | Gray, III et al. |
| 6,157,733 | A | 12/2000 | Swain |

FOREIGN PATENT DOCUMENTS

| | | |
|---|---|---|
| EP | 1056050 | 11/2000 |
| JP | 10222694 | 8/1998 |
| JP | 11328437 | 11/1999 |
| JP | 2000-132706 | 5/2000 |
| WO | 9949417 | 9/1999 |

OTHER PUBLICATIONS

English Language Abstract of JP 10–222694.
English Language Abstract of JP 11–328437.

*Primary Examiner*—Mark Zimmerman
*Assistant Examiner*—Adam Arnold
(74) *Attorney, Agent, or Firm*—Greenblum & Bernstein, P.L.C.

(57) ABSTRACT

A scene in a virtual three-dimensional space is divided into multiple regions in accordance with the depth from a prescribed viewing point. Filtering levels are set for the respective divisional regions. Filtering processing is performed that imparts visual effects such as blurring to the respective regions of the scene in degrees corresponding to the respective filtering levels. A resulting scene is displayed on a display device. Since a single filtering level is determined for each of the regions obtained by dividing the scene in accordance with the depth and calculations are performed under common conditions on the pixels belonging to each region, the processing is relatively simple.

19 Claims, 20 Drawing Sheets

| FILTER B10 | | |
|---|---|---|
| NO. | Z VALUE | α VALUE |
| 1 | Z0 | 1 |
| 2 | Z1 | 0.5 |
| 3 | Z2 | 0 |
| 4 | Z3 | 0.5 |
| 5 | Z4 | 1 |

FIG. 12A
| FILTER A10 |
|---|
| Zmax = Z0 |
| Zmin = Z14 |
| α1 = 0 |
| α2 = 0 |
| N = 5 |
FIG. 12B
| FILTER A11 |
|---|
| Zmax = Z15 |
| Zmin = Z18 |
| α1 = 0.25 |
| α2 = 1 |
| N = 4 |
FIG. 12C
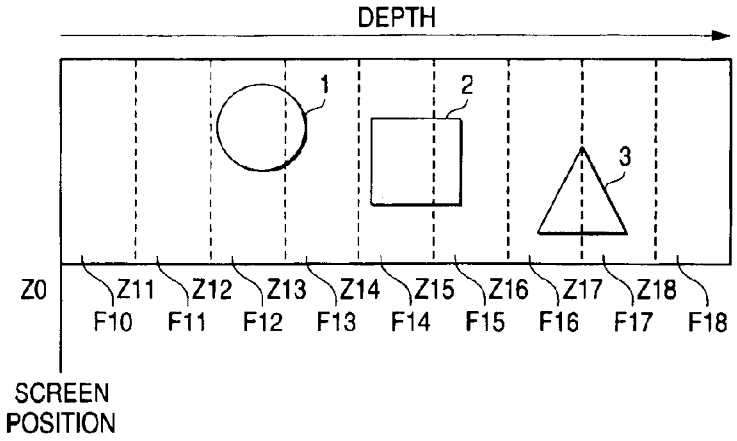
FIG. 12D
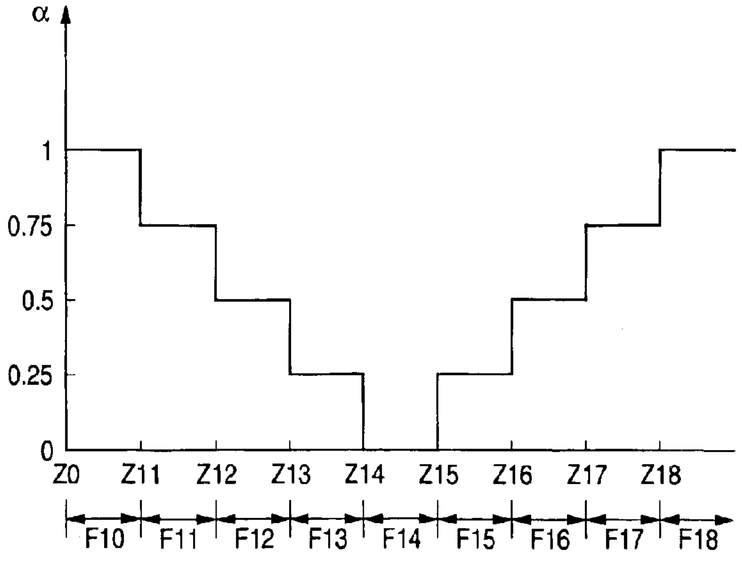

FIG. 13A
| FILTER A20 |
|---|
| Zmax = Z0 |
| Zmin = Z22 |
| α1 = 1 |
| α2 = 0 |
| N = 3 |
FIG. 13B
| FILTER B20 | | |
|---|---|---|
| NO. | Z VALUE | α VALUE |
| 1 | Z23 | 0.5 |
| 2 | Z24 | 1 |
FIG. 13C
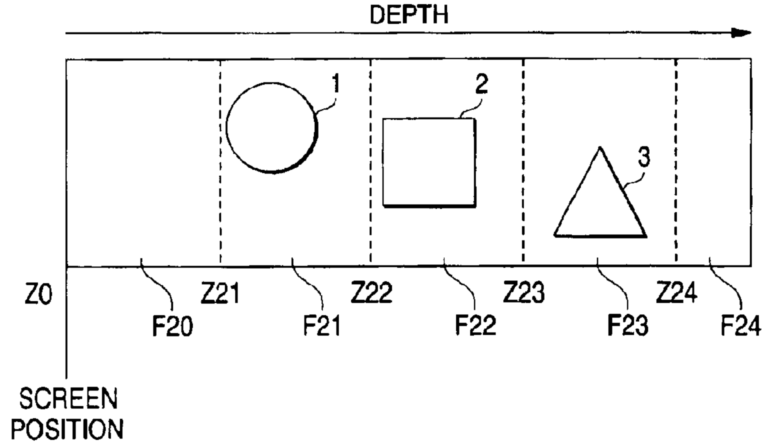
FIG. 13D
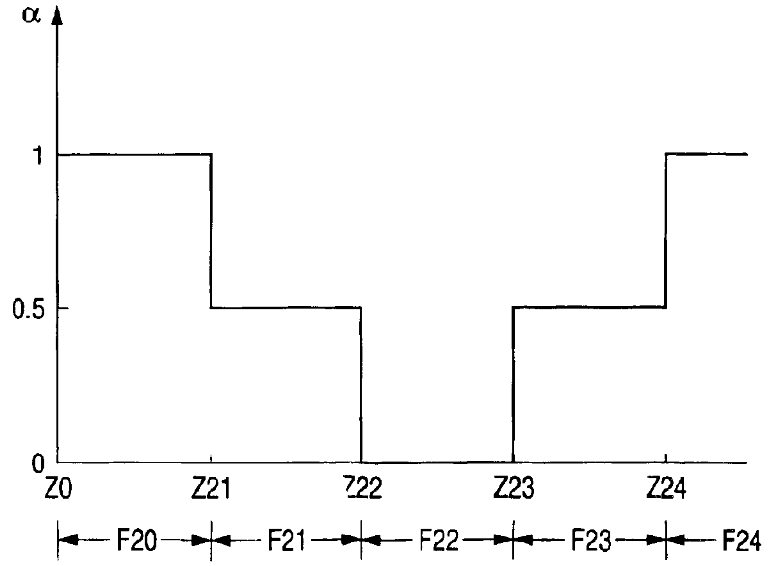

S300

FILTERING PROCESSING ON SCENE IN VIRTUAL 3-D SPACE

CROSS REFERENCE TO RELATED APPLICATION

The present disclosure relates to subject matter contained in Japanese Patent Application No. 2000-391493, filed on Dec. 22, 2000, the disclosure of which is expressly incorporated herein by reference in its entirety.

BACKGROUND OF THE INVENTION

1. Field of the Invention

The present invention relates to a video game apparatus, its control method, a game program, and a computer-readable recording medium on which such a program is recorded. In particular, the invention relates to filtering processing on a scene in a virtual three-dimensional space.

2. Description of the Related Art

In 3D video games, a two-dimensional image is generated in real time based on objects etc. in a virtual three-dimensional space. A more realistic image can be generated by imparting visual effects to the generated two-dimensional image through various kinds of filtering processing. For example, filtering processing that blurs an image in accordance with the depth in a virtual three-dimensional space produces a perspective image.

Techniques of blurring an image in accordance with the depth in a virtual three-dimensional space in image processing on a three-dimensional computer image that is used in a video game are disclosed in Japanese Unexamined Patent Publication Nos. Hei. 10-222694 and Hei. 11-328437. For example, in the method disclosed in the publication No. Hei. 10-222694, influences of image data of each pixel on surrounding pixels are determined based on the difference between the Z value and the depth of field. And a calculation taking influences of surrounding pixels into consideration is performed for every pixel. In this calculation, the values of nine pixels that are the subject pixel itself and eight surrounding pixels are used. In this technique, the pixel value of every pixel is calculated under varied conditions that are determined for each pixel.

SUMMARY OF THE INVENTION

In games with fast movement of characters such as fighting games, it is not important that the degree of visual effect such as blurring be set in a detailed manner in accordance with a slight difference in depth. For example, proper perspective in a game can be obtained by displaying a player character and surrounding objects clearly in a uniform manner and blurring objects closer to the viewer's side, as well as a background, etc. Therefore, from the viewpoint of reducing the load on the hardware, it is more important to perform, as simple processing as possible, filtering the degree of which varies in accordance with the depth than to perform blurring processing that varies pixel by pixel.

An object of the present invention is therefore to provide a video game apparatus, its control method, a game program, and a computer-readable recording medium on which such a program is recorded that make it possible to perform, as simple processing, filtering for imparting a visual effect that varies in accordance with the depth to a scene in a virtual three-dimensional space.

A video game program for displaying a scene in a virtual three-dimensional space on a screen is recorded on a computer-readable recording medium according to the invention. The program causes a computer to execute a process including dividing the scene into a group of regions in accordance with distances from a prescribed viewing point in a depth direction; setting filtering levels for the respective divisional regions; performing filtering processing that imparts visual effects to the respective regions of the scene in accordance with the respective filtering levels thus set; and displaying a scene obtained by the filtering processing on the screen.

A rule for division into the regions and filter data specifying the filtering levels that are set for the respective regions may further be recorded on the recording medium. In this case, the program may cause the computer to execute a process including dividing the scene into the regions according to the division rule; setting the filtering levels specified by the filter data for the respective divisional regions; storing, in a first storage device, each of the filtering levels that is set for an associated one of the divisional regions so as to be correlated with pixels belonging to the associated region; storing pixel data of a scene obtained by the filtering processing in a second storage device; and reading the pixel data from the second storage device and sending it to a display device. Although in the embodiment described below both of the first storage device and the second storage device are a frame buffer in a VRAM, they may be separate storage devices.

The filtering levels may be set in such a manner that a filtering level for a region closer to the viewing point is set earlier. The filtering processing may be such that a scene for filtering is generated by imparting a uniform visual effect to an original scene as a whole and the scene for filtering is combined with the original scene at a ratio corresponding to each of the filtering levels that are set for the respective regions.

The scene may be defined by a two-dimensional original image generated by performing perspective projection on the scene with respect to the viewing point and information relating to the original image and indicating distances from the viewing point in the depth direction. In this case, the filtering processing may be such that a filtered image is generated by imparting a uniform visual effect to the original image as a whole and the filtered image is combined with the original image at a ratio corresponding to each of the filtering levels that are set for the respective regions. The filtering levels may be degrees of opaqueness. In this case, the combining may be additive combining or semitransparent combining using the degrees of opaqueness. The visual effects may be blurring effects or diffuse glow effects.

A video game program according to the invention displays a scene in a virtual three-dimensional space on a screen. The program causes a computer to execute a process of dividing the scene into a group of regions in accordance with distances from a prescribed viewing point in a depth direction; setting filtering levels for the respective divisional regions; performing filtering processing that imparts visual effects to the respective regions of the scene in accordance with the respective filtering levels thus set; and displaying a scene obtained by the filtering processing on the screen.

A video game apparatus according to the invention includes a display device; a computer-readable recording medium on which a program for displaying a scene in a virtual three-dimensional space on a screen of the display device is recorded; and a computer for reading the program from the recording medium and executing the program. The computer executes, by reading the program from the recording medium, a process of dividing the scene into a group of regions in accordance with distances from a prescribed viewing point in a depth direction; setting filtering levels for the respective divisional regions; performing filtering processing that imparts visual effects to the respective regions of the scene in accordance with the respective filtering levels thus set; and displaying a scene obtained by the filtering processing on the screen.

A control method according to the invention controls a video game apparatus including a computer and a display device and displays a scene in a virtual three-dimensional space on a screen of the display device. The control method causes the computer to execute a process of dividing the scene into a group of regions in accordance with distances from a prescribed viewing point in a depth direction; setting filtering levels for the respective divisional regions; performing filtering processing that imparts visual effects to the respective regions of the scene in accordance with the respective filtering levels thus set; and displaying a scene obtained by the filtering processing on the screen.

According to the invention, a single filtering level is determined for each region obtained by dividing a scene in accordance with the distance in the depth direction and calculations are performed under common conditions on the pixels belonging to each region. Therefore, visual effects can be imparted to the scene by simpler processing than in the conventional technique in which calculations are performed under varied conditions that are determined independently for individual pixels.

BRIEF DESCRIPTION OF THE DRAWINGS

FIGS. 1A and 1B show the principle of an embodiment of the present invention in which FIG. 1A shows the depth of a scene in a virtual three-dimensional space and FIG. 1B shows a distribution of α values in a perspective of the scene of FIG. 1A;

FIGS. 12A and 12B show another example of filter data;

FIG. 12C shows a manner of dividing a scene into regions that corresponds to the filter data of FIGS. 12A and 12B;

FIG. 12D shows an α value distribution of the filter data of FIGS. 12A and 12B;

FIGS. 13A and 13B show a further example of filter data;

FIG. 13C shows a manner of dividing the scene into regions that corresponds to the filter data of FIGS. 13A and 13B;

FIG. 13D shows an α value distribution of the filter data of FIGS. 13A and 13B;

DESCRIPTION OF THE PREFERRED EMBODIMENT

Embodiments of the present invention will be hereinafter described with reference to the accompanying drawings. Before a detailed description of the embodiment is provided, its principle will be described.

A scene in a virtual three-dimensional space can be defined by a two-dimensional image obtained by performing perspective projection on the scene with respect to a prescribed viewing point and information indicating a distance from the viewing point in the depth direction. Therefore, to perform filtering processing on a scene in a virtual three-dimensional space, the embodiment utilizes depth information and a two-dimensional image obtained by perspective projection. Specifically, a filtered image (e.g., a uniformly blurred image) is generated based on the two-dimensional image and filtering processing is performed by combining the filtered image with the original two-dimensional image. The combining ratio between the filtered image and the original two-dimensional image depends on the filtering level that is set for each pixel of the original image. In the embodiment, a scene is divided into multiple regions in accordance with the distance in the depth direction and a single filtering level is set for each region.

Figure 1A:
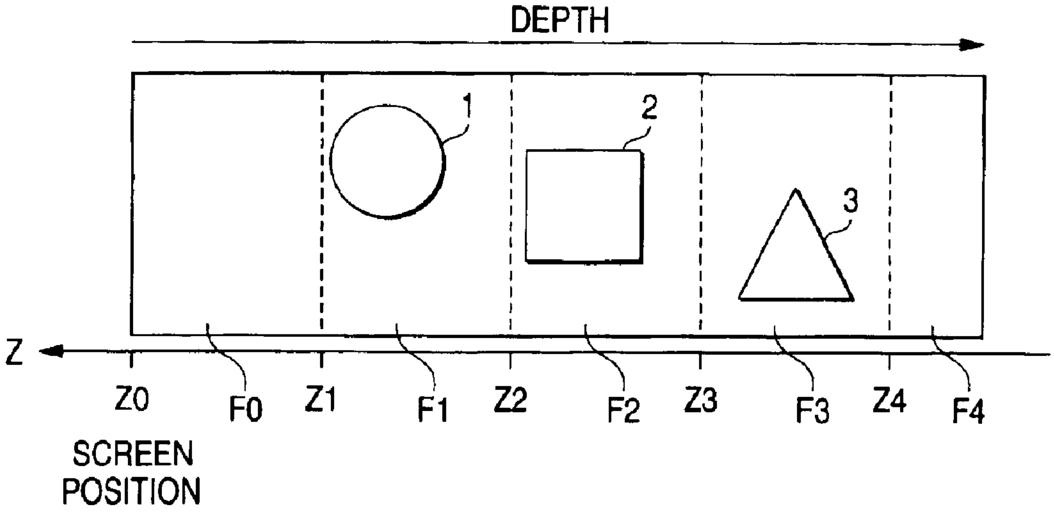

FIG. 1A shows a scene in a virtual three-dimensional space along the depth direction extending from a viewing point (camera). This three-dimensional scene includes objects 1–3 that are arranged in order from the viewer's side. The objects 1–3 are a sphere, a cube, and a cone, respectively. The Z-axis coordinate that is parallel with the direction of the camera can represent the depth. As indicated by an arrow in FIG. 1A, the Z value decreases as the position moves from the viewer's side deeper into the scene. Therefore, Z values Z0–Z4 in FIG. 1A have a relationship Z0>Z1>Z2>Z3>Z4. Usually, when a two-dimensional image is generated by performing perspective projection on a three-dimensional scene, Z values of respective pixels of the two-dimensional image are acquired.

In one embodiment, a three-dimensional scene is divided into multiple regions in accordance with the distance in the depth direction. In the example of FIG. 1A, the scene is divided into five regions F0–F4. The region F0 has a Z-value range of Z0≧Z>Z1. The region F1 has a Z-value range of Z1≧Z>Z2. The region F2 has a Z-value range of Z2≧Z>Z3. The region F3 has a Z-value range of Z3≧Z>Z4. The region F4 has a Z-value range of Z4≧Z. Z0 is the Z-value of a screen. The screen is a projection surface onto which objects in a virtual three-dimensional space are perspective-projected.

A single filtering level is set for each of the regions F0–F4. The filtering level is a value that indicates the degree of influence of filtering processing on the original image. In the embodiment, the α value that is used in semitransparent combining etc. is used as an example of the filtering level. The α value represents the degree of opaqueness of a filtered image to be combined with the original image. As the α value increases, a filtered image becomes less transparent. For example, where the range of α is 0 to 1, a filtered image is transparent when the α value is equal to 0 and is completely opaque when α value is equal to 1. Stepwise filtering processing that depends on the depth can be performed on an original image by combining a filtered image with the original image using α values.

Figure 1B:
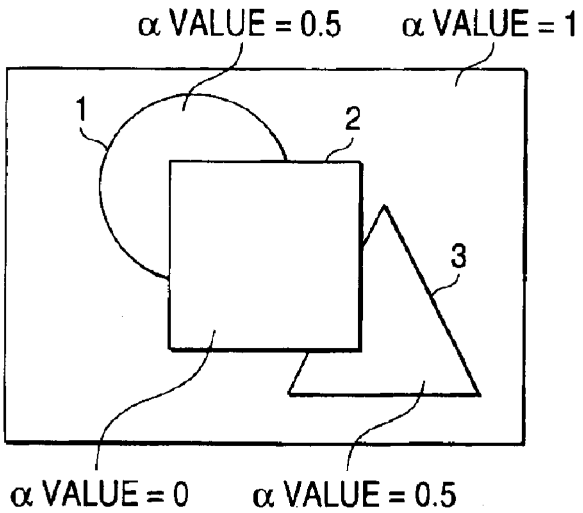

FIG. 1B shows an example distribution of α values on a two-dimensional image obtained from the three-dimensional scene of FIG. 1A by perspective projection. In this example, α values 0.5, 0, and 0.5 are set for the objects 1–3 in the regions F1–F3, respectively. An α value 1 is set for a background in the region F4. Where a filtered image is an image obtained by blurring the original image uniformly, if the filtered image is combined with the original image by using the above α values, an image having blurring effects that vary stepwise in accordance with the depth is produced; that is, the object 2 has no blurring effect, the background has a profound blurring effect, and the objects 1 and 3 have an intermediate blurring effect.

Preferred embodiments will be hereinafter described in detail in an example in which the invention is applied to a home game system.

Figure 2:
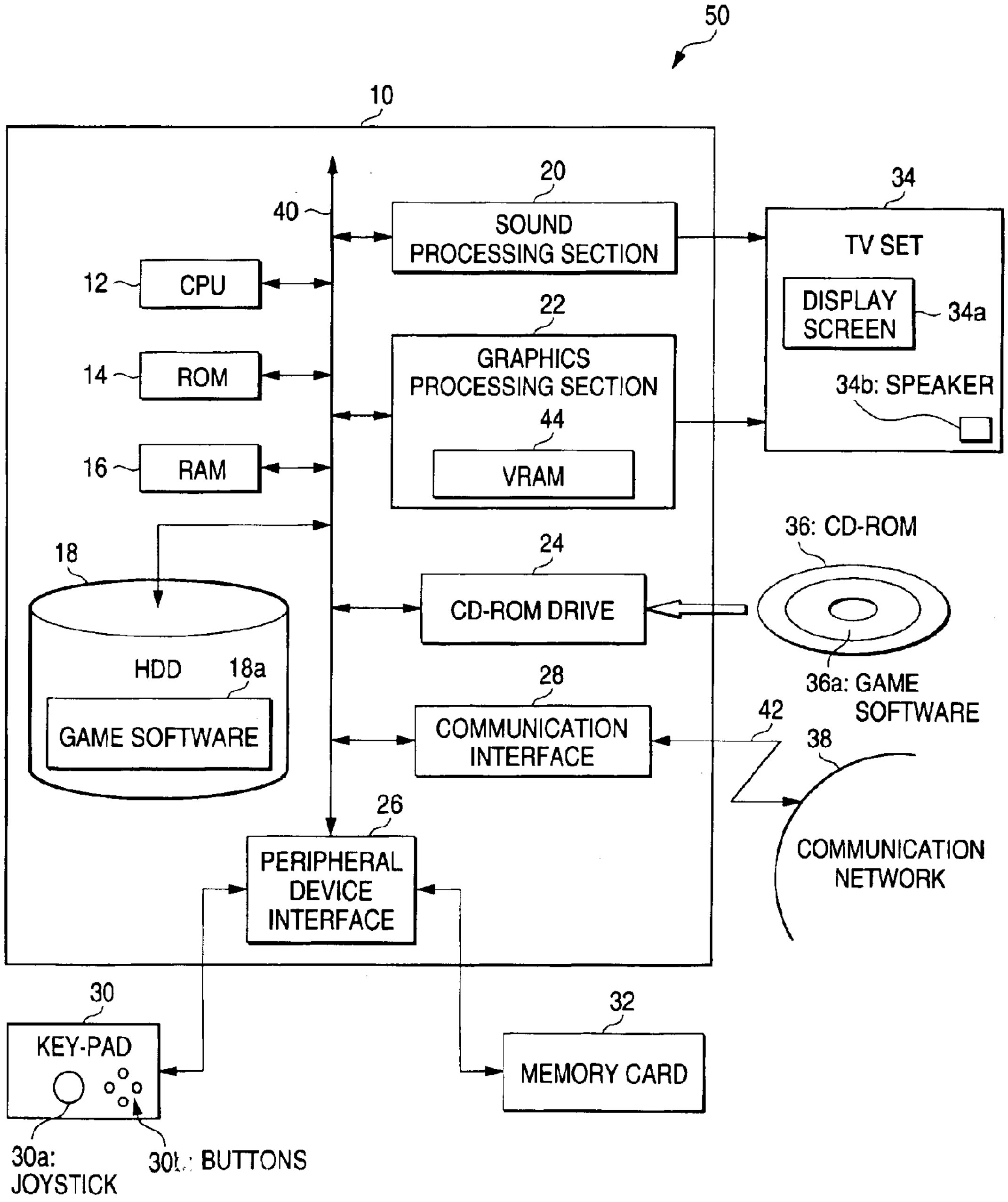
FIG. 2 is a block diagram showing an exemplary configuration of a video game system according to an embodiment.

FIG. 2 is a block diagram showing the configuration of an exemplary video game system according to an embodiment. The video game system 50 has a game machine main body 10 for controlling the system 50 and a key-pad 30 and a television (TV) set 34 that are connected to the game machine main body 10. The game system 50 also has a memory card 32 for storing game data such as interim data and environment setting data of a game.

The game machine main body 10 is a computer and is a home game machine in this example. However, the invention is not limited to such a case.

For example, as shown in FIG. 2, the game machine main body 10 is composed of a CPU (central processing unit) 12, a ROM (read-only memory) 14, a RAM (random-access memory) 16, an HDD (hard disk drive) 18, a sound processing section 20, a graphics processing section 22, a CD-ROM drive 24, a peripheral device interface 26, and a communication interface 28. The above components are connected to each other via a bus 40.

The CPU 12 controls the operation of the game machine main body 10 according to a given program. Programs such as a boot program for the game machine main body 10 and an OS (operating system) are stored in the ROM 14. The RAM 16, which is a main storage device to be used for the CPU 12 to execute a program, stores a program to be executed by the CPU 12 and data necessary for that purpose. The RAM 16 is also used as a work area during execution of a program. The HDD 18 is an auxiliary storage device to be used for the CPU 12 to execute a program.

The sound processing section 20 performs processing for reproducing sound data such as background music (BGM) or a sound effect according to instructions from the CPU 12 and supplies a resulting sound signal to the TV set 34.

The graphics processing section 22 performs three-dimensional graphics processing according to instructions from the CPU 12 and generates image data. The graphics processing section 22 generates a video signal by adding prescribed sync signals to the generated image data and supplies the video signal to the TV set 34.

When mounted with a CD-ROM 36, the CD-ROM drive 24 drives the CD-ROM 36 according to instructions from the CPU 12 and transfers a program and data that are stored in the CD-ROM 36 via the bus 40.

The key-pad 30 and the memory card 32 are connected to the peripheral device interface 26. The peripheral device interface 26 controls data exchange between the key-pad 30 and the memory card 32 and the individual components of the game machine main body 10 such as the CPU 12 and the RAM 16.

The communication interface 28 can be connected to an external network 38 via a communication line 42. That is, the game machine main body 10 can be connected to the external network 38 via the communication interface 28. The communication interface 28 controls exchange of information (program and data) between the game machine main body 10 and the communication network 38. A game program and data that have been downloaded from the external communication network 38 via the communication interface 28 and the communication line 42 can be stored in the HDD 18.

Game software 36*a* is stored in the CD-ROM 36. The game software 36*a* contains a game program for controlling the CPU 12 and thereby causing it to perform processing that is necessary for execution of a computer game as well as data necessary for that purpose. The game program includes a program for causing the game system 50 to execute filtering processing according to the embodiment. The game software 36*a* can be read out by causing the CD-ROM drive 24 to operate.

The game system 50 can store the game software 18*a* in the HDD 18. The game software 18*a* may be pre-installed in the HDD 18 or installed in the HDD 18 from the CD-ROM 36. As described above, the game software 18*a* can be downloaded from the communication network 38.

The TV set 34 is an output device of the game system 50. The TV set 34 displays an image on a display screen 34*a* according to a video signal that is supplied from the graphics processing section 22 and outputs sound from a speaker 34*b* according to a sound signal that is supplied from the sound processing section 20. Therefore, the TV set 34 serves as both a display device and a sound output device.

The key-pad 30 is an input device that is manipulated by a player. The player can input an instruction to the game machine main body 10 by manipulating the key-pad 30. The key-pad 30 supplies various manipulation signals corresponding to inputs of the player to the game machine main body 10 via the peripheral device interface 26. The key-pad 30 is equipped with a joystick 30*a* to be used for inputting direction information and buttons 30*b* including a start button that are used to output a game start instruction etc. The key-pad 30 has a vibration function. That is, the key-pad 30 incorporates a motor, which operates when receiving a prescribed control signal from the game machine main body 10 and can vibrate the key-pad 30 in its entirety.

The memory card 32, which is formed by a flash memory, is an auxiliary storage device for storing game data under the control of the game machine main body 10.

The CPU 12 controls the operation of the game machine main body 10 based on basic software that is stored in the ROM 14 and game software that is read from the CD-ROM 36 by the CD-ROM drive 24 and stored in the RAM 16. For example, the CPU 12 reads out graphics data from the CD-ROM 36, transfers it to the graphics processing section 22, and instructs the graphics processing section 22 to generate an image. In response to the instruction, the graphics processing section 22 generates a video signal using the graphics data. The video signal is sent to the TV set 34. In this manner, an image is displayed on the display screen 34*a* of the TV set 34.

Figure 3:
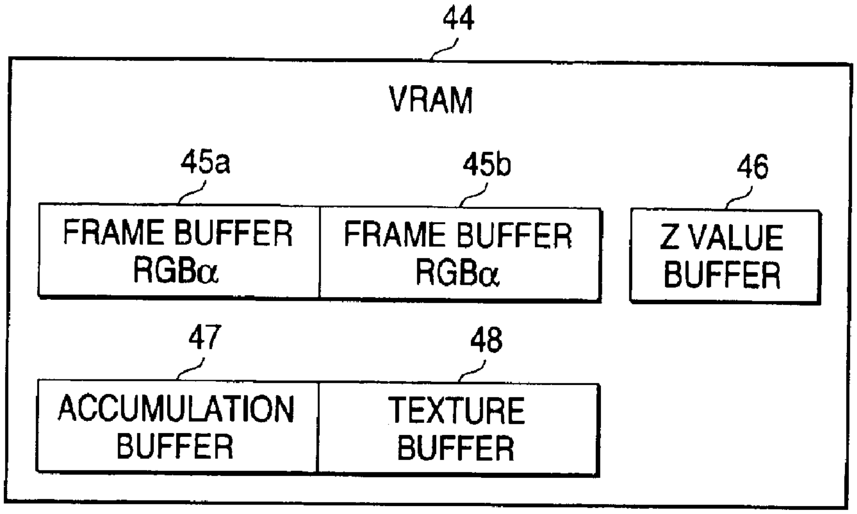
FIG. 3 shows exemplary storage areas of a VRAM of a game machine main body.

The graphics processing section 22 incorporates a VRAM 44 that is a storage device for graphics processing. FIG. 3 shows exemplary storage areas of the VRAM 44. As shown in FIG. 3, the VRAM 44 includes two frame buffers 45*a* and 45*b* and a Z-value buffer 46. The frame buffers 45*a* and 45*b* store image data to be displayed on the display screen 34*a* of the TV set 34. In each of the frame buffers 45*a* and 45*b*, 8 bits×3 (pixel components)=24 bits for storage of lightness values of R, G, and B (red, green, and blue) components of each pixel and 8 bits for storage of an α value that is set for each pixel are allocated for each pixel. The Z-value buffer 46 stores Z values indicating depths in a virtual three-dimensional space of pixels whose data are stored in the frame buffer 45*a* or 45*b* in such a manner that they are correlated with the respective pixel values. As described above, the Z value decreases as the position moves from the viewer's side to the deep side in a virtual three-dimensional space. The VRAM 44 also includes an accumulation buffer 47 and a texture buffer 48. The accumulation buffer 47 is a work area that is used in performing filtering processing. The texture buffer 48 store texture data that are necessary for display of polygons. As in the case of the frame buffers 45*a* and 45*b*, in the accumulation buffer 47, 8 bits×3 (pixel components)=24 bits for storage of lightness values of the R, G, and B components of each pixel and 8 bits for storage of an α value that is set for each pixel are allocated for each pixel.

Figure 4:
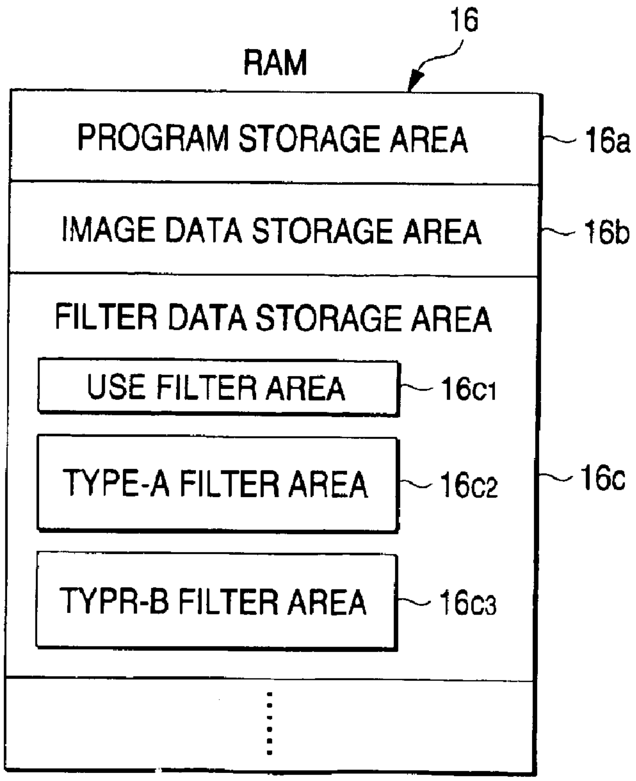
FIG. 4 shows exemplary storage areas of a RAM of the game machine main body.

FIG. 4 shows storage areas of the RAM 16. As shown in FIG. 4, the RAM 16 is provided with a program storage area 16*a*, an image data storage area 16*b*, and a filter data storage area 16*c*. The program storage area 16*a* stores a game program. The image data storage area 16*b* stores image data of game characters, a background, etc. that are necessary during execution of a program. A program and image data to be stored in the program storage area 16*a* and the image data storage area 16*b* are read from the CD-ROM 36 by the CD-ROM drive 24 and transferred to the RAM 16 under the control of the CPU 12. The RAM 16 also stores various data that are generated during execution of a program. A game program and various data may be stored in the hard disk drive 18.

The filter data storage area 16*c* of the RAM 16 will be described below with reference to FIG. 4 and FIGS. 5A and 5B.

As shown in FIG. 4, the filter data storage area 16*c* includes a use filter area $16c_1$, a type-A filter area $16c_2$, and a type-B filter area $16c_3$. The use filter area $16c_1$, stores at least one filter data to be applied to an original image. The filter data of this area is updated when necessary, for example, when it is necessary to change the visual effect to be exerted on an original image. When it is not necessary to exert a visual effect on an original image, the filter data in this area may be cleared as invalid data.

The type-A filter area $16c_2$ and the type-B filter area $16c_3$ store type-A filter data and type-B filter data, respectively. That is, two kinds of filter data are prepared in the embodiment.

Figure 5A:
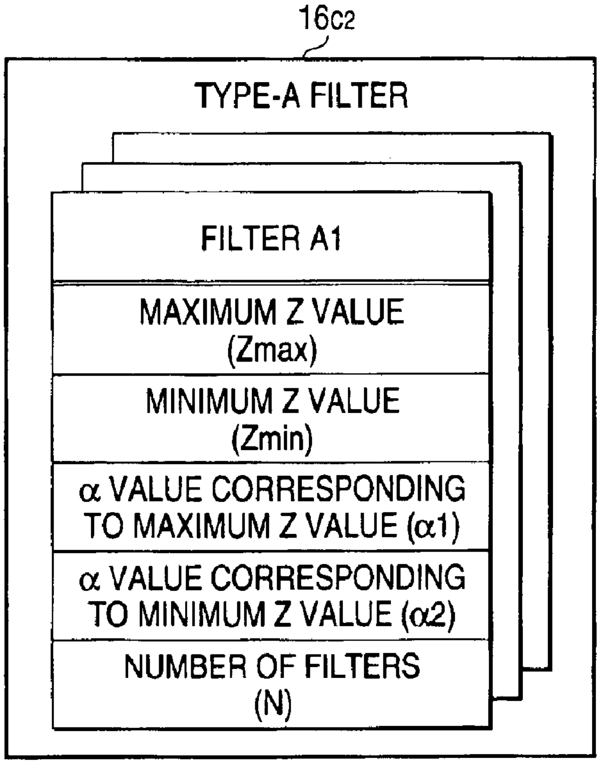
FIGS. 5A and 5B show exemplary structures of a type-A filter area and a type-B filter area, respectively.
Figure 5B:
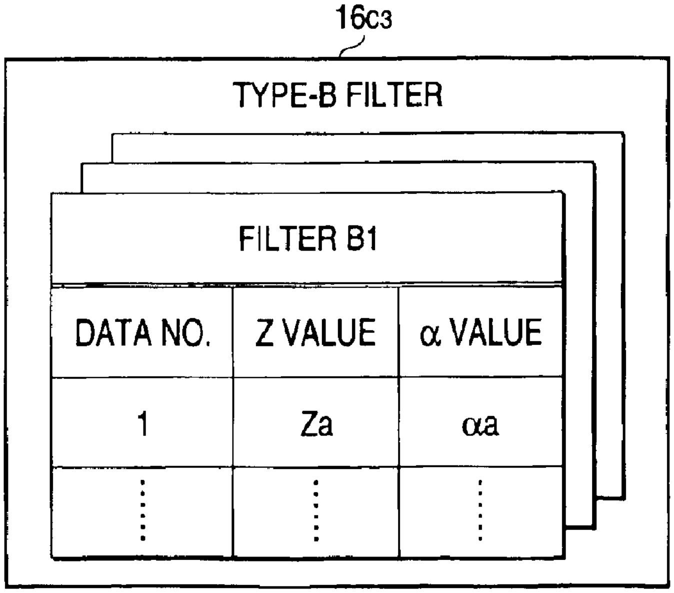

FIGS. 5A and 5B shows the structures of the type-A filter area $16c_2$ and the type-B filter area $16c_3$, respectively. The type-A filter area $16c_2$ contains multiple type-A filter data such as a filter A1, and the type-B filter area $16c_3$ contains multiple type-B filter data such as a filter B1. Whether it is of type A or type B, each filter data defines multiple regions obtained by dividing a three-dimensional original scene in accordance with the depth from the viewing point as well as α values that are set for the respective regions. An arbitrary number of filter data can be prepared. For example, the filter data storage area 16*c* may contain only one type-A filter data and one type-B filter data. The filter data storage area 16*c* may contain one kind of or three or more kinds of filter data or filter data groups.

As shown in FIG. 5A, each type-A filter data contains a maximum Z value Zmax, a minimum Z value Zmin, an α value α1 for when the Z value is equal to the maximum value Zmax, an α value α2 for when the Z value is equal to the minimum value Zmin, and the number N of filters (N: natural number). On the other hand, as shown in FIG. 5B, each type-B filter data contains a prescribed number of data pairs each consisting of a Z value and an α value. How these data components are used will be described later in detail. The Z value can be any real number that is greater than or equal to 0. The α value can be any real number in a range of 0 to 1.

A game processing procedure according to the embodiment will be described below. The following process is executed in such a manner that the game machine main body 10 executes a game program stored in the CD-ROM 36.

Figure 6:
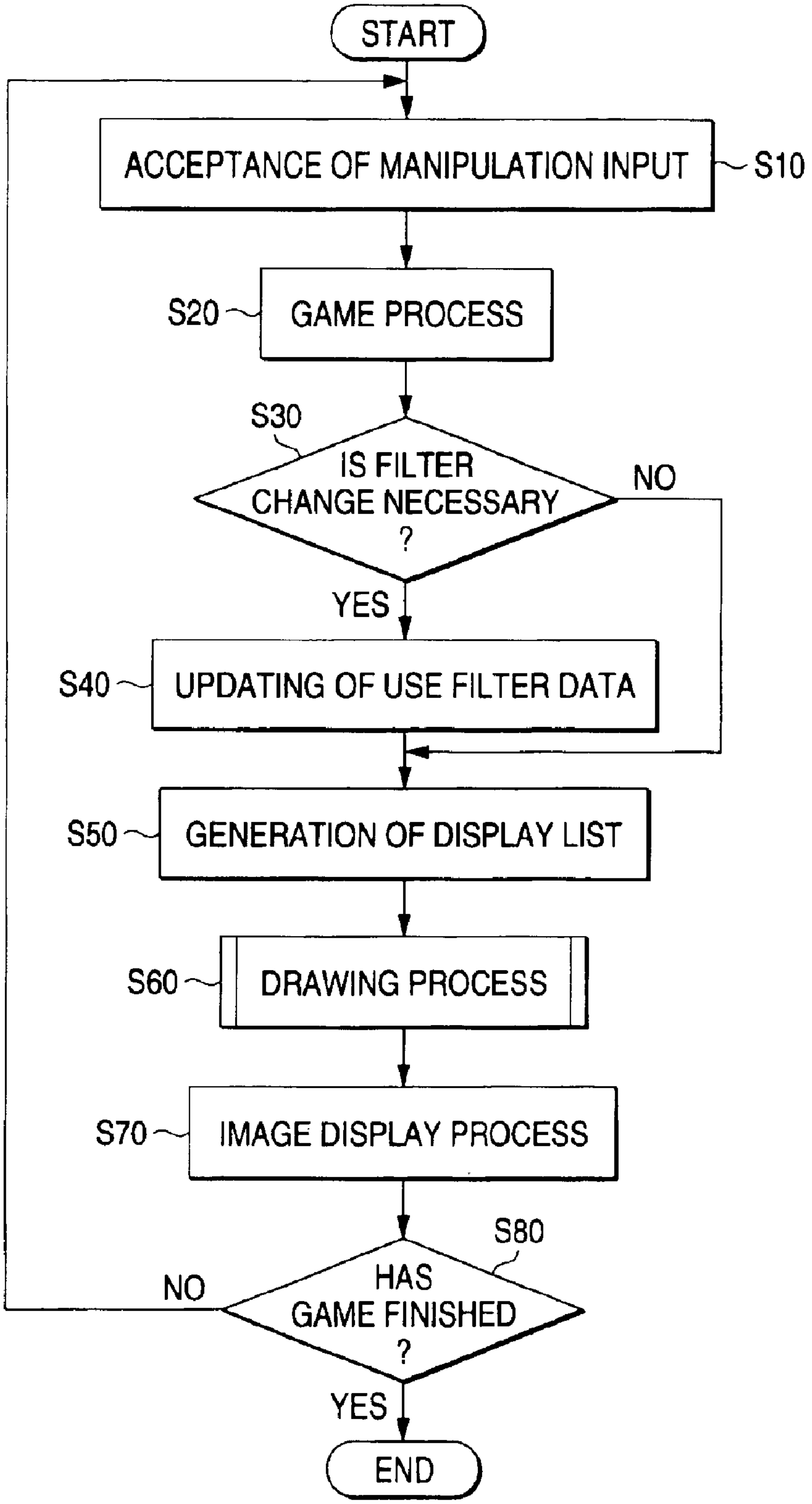
FIG. 6 is a flowchart showing an exemplary process for controlling a game totally.

FIG. 6 is a flowchart showing an exemplary process for controlling a game. At step S10, the game machine main body 10 accepts input of a manipulation by a player via the key-pad 30. At step S20, the game machine main body 10 executes a game process as a response to the manipulation input. In the game process, calculations etc. are performed to cause the game to reflect the input of the player.

At step S30, it is judged whether it is necessary to change the filter that is currently used. For example, a filter change may be needed in response to the input of the player at step S10. For example, a filter change is needed when the scene of the game has been switched or the position of the viewing point has been switched. If it is judged that the filter needs to be changed (yes at step S30), at step S40 the user filter data that are stored in the user filter area $16c_1$, of the RAM 16 are updated. Specifically, at least one filter data to be used is selected from the filter data stored in at least one of the type-A filter area $16c_2$ and the type-B filter area $16c_3$ and the selected filter data is written to the user filter area $16c_1$.

Where multiple filter data are written to the use filter area $16c_1$, filter data are selected so that the Z-value ranges of the respective filter data each of which is defined by the maximum Z value and the minimum Z value contained in each filter data do not overlap with each other. In this manner, different filter data are applied to respective regions that are formed by dividing a virtual three-dimensional space along the depth. As described later, filter data having greater Z values are processed earlier.

If it is judged that it is not necessary to change the filter (no at step S30) or when the use filter data is updated, a display list is generated at step S50. Specifically, objects to be drawn are enumerated and a list containing information necessary to draw each object such as polygon shapes, positions of the pieces of the polygons in the frame buffer, a Z value, and a color is generated. Perspective projection is performed in generating this list.

At step S60, the objects listed in the display list are drawn sequentially and a two-dimensional image to be displayed is generated. The drawing process will be described later in more detail. At step S70, the image generated by the drawing process at step S60 is output to the TV set 34 and displayed on the display screen 34*a*.

At step S80, it is judged whether the game has finished. If it is judged that the game has finished (yes at step S80), the process is finished. If it is judged that the game has not finished yet (no at step S80), the process returns to step S10, where manipulation input is accepted. In this manner, steps S10–S80 are repeatedly executed until it is judged that the game has finished at step S80.

Figure 7:
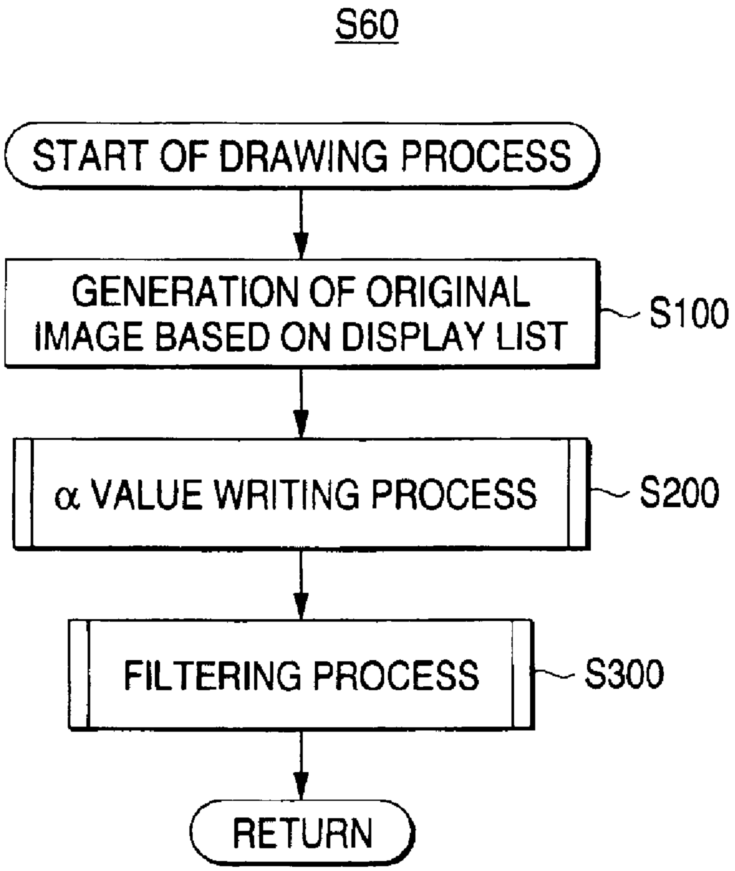
FIG. 7 is a flowchart showing an exemplary drawing process.

FIG. 7 is a flowchart showing exemplary drawing process of step S60. In the drawing process, first, at step S100, a two-dimensional image is generated based on a display list. This two-dimensional image is an original image on which a filtering process should be executed. The original image is stored in one of the frame buffers 45*a* and 45*b* of the VRAM 44, for example, one in which an older image is stored. The contents of the frame buffer are updated. As a result, lightness values of R, G, and B components of each pixel are stored in the frame buffer so as to be correlated with each pixel. At step S100, Z values corresponding to the respective pixels are stored in the Z value buffer 46 so as to be correlated with the respective pixels. At this time point, a value commensurate with the lightness value that has been written for each pixel is set in the 8 bits for α value storage that are allocated in the frame buffer. For example, when a semitransparent image has been written, values indicating the degree of opaqueness of the image are written as α values of pixels where the image has been written.

Then, an α value writing process and a filtering process, both of which will be described later in detail, are executed at step S200 and S300, respectively. The drawing process is completed upon completion of the filtering process. At step S70 in FIG. 6, the contents of the frame buffer 45*a* or 45*b* are displayed on the display screen 34*a* of the TV set 34.

Figure 8:
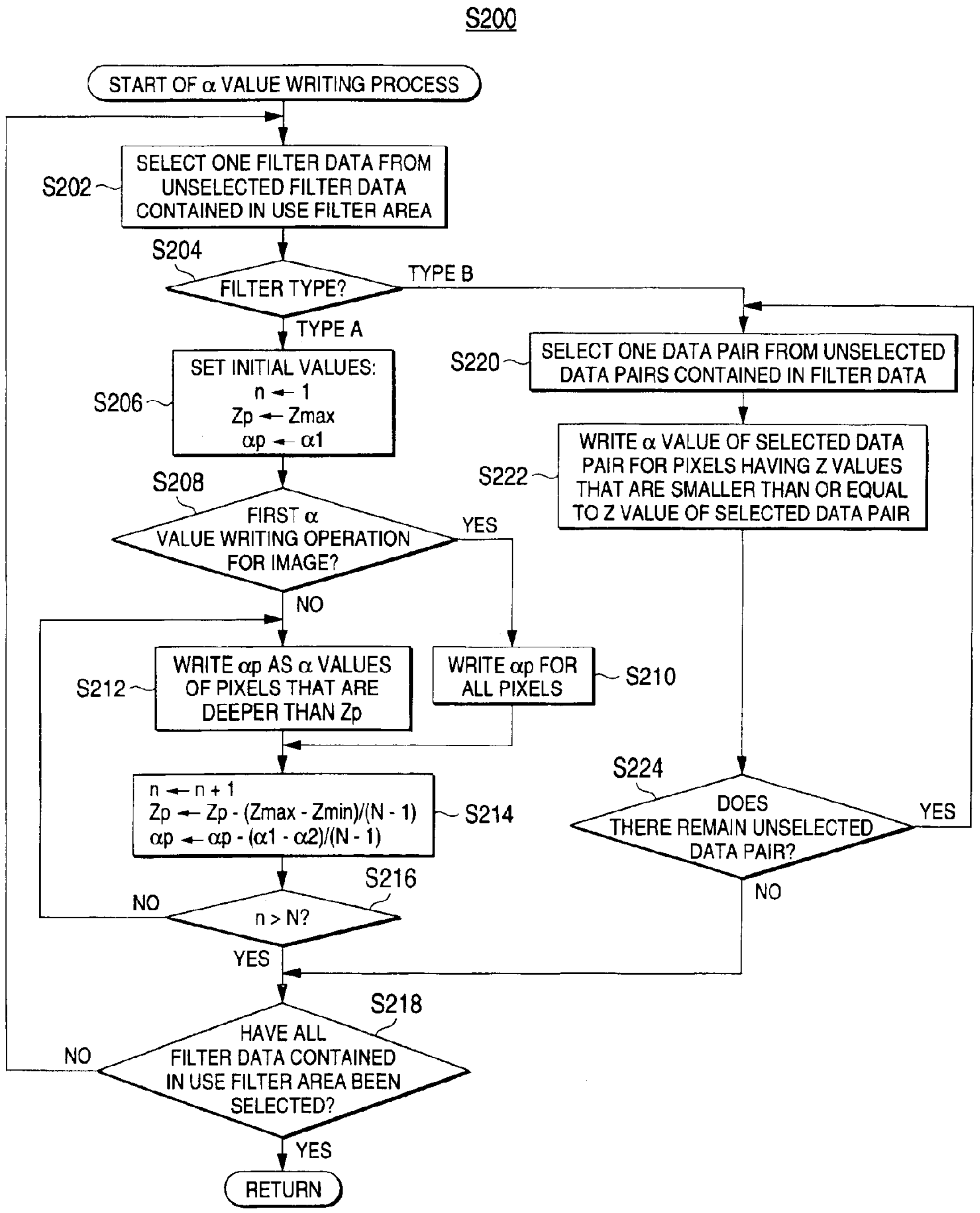
FIG. 8 is a flowchart showing an exemplary α value writing process.

FIG. 8 is a flowchart showing an exemplary α value writing process of step S200. In this process, first, at step S202, one filter data is selected from the at least one filter data contained in the use filter area 16*c*$_1$ of the RAM 16. The selection is made based on the Z value ranges where the respective filter data are applied. That is, filter data having greater Z values are selected earlier. As a result, filter data to be applied to a region closer to the viewer's side in the three-dimensional scene is processed earlier. This will be described later in more detail.

At step S204, the type of the selected filter data is judged. First, a process that is executed when it is judged that the filter type is A will be described. As described above with reference to FIG. 5A, one type-A filter data contains a maximum Z value Zmax, a minimum Z value Zmin, an α value α1 when the Z value is equal to the maximum value Zmax, an α value α2 when the Z value is equal to the minimum value Zmin, and the number N of filters. The number N of filters is the number of regions formed by dividing the scene in accordance with the depth.

At step S206, initial values of n that represents the number of α value writing operations, Zp that is a Z value that determines a region where the filter is applied in the virtual three-dimensional space, and αp that is written as an α value are set. Specifically, n, Zp, and αp are set at 1, Zmax, and α1, respectively.

At step S208, it is judged whether this α value writing operation is the first one performed on the original image. If the filter data being processed is filter data that was selected first at step S202, this α value writing operation should be the first one performed on the original image.

If it is judged that this α value writing operation is the first one performed on the original image (yes at step S208), at step S210 αp is written for all pixels of the original image. Since αp was set at α1 at step S206, α1 is set for all the image. After completion of the writing of the α value for all the image, the process goes to step S214.

If it is judged that this α value writing operation is not the first one performed on the original image (no at step S208), at step S212 αp is written to the frame buffer (the frame buffer 45*a* or 45*b* shown in FIG. 3) where the original image is stored as α values of pixels of the original image that have Z values smaller than or equal to Zp. In other words, the α values of objects at positions that are the same as or deeper than the position indicated by Zp in the virtual three-dimensional space are set at αp uniformly. Pixels having Z values that are smaller than or equal to Zp can be determined by referring to the Z value buffer 46 of the VRAM 44.

At step S214, n is incremented by 1, Zp is decreased by ΔZ=(Zmax−Zmin)/(N−1), and αp is decreased by Δα=(α1−α2)/(N−1). If α1<α2, Δαbecomes a negative number. Where Δα is a negative number, αp increases when Δα is subtracted from it.

At step S216, the number n of α value writing operations is compared with the number N of filters and it is judged whether n>N. If the relationship n>N is not satisfied (no at step S216), the process returns to step S212 and the nth α value writing operation will be performed. In this manner, steps S212–S216 are repeatedly executed until n becomes greater than N. On the other hand, if n>N (yes at step S216), the process goes to step S218. The setting of α values based on the type-A filter data is performed in the above-described manner.

Figure 9A:
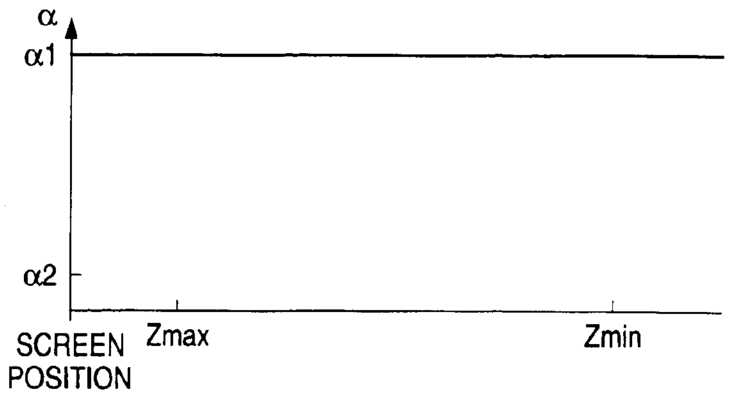
FIGS. 9A–9D show an example of how α values are set in accordance with Z values based on type-A filter data.
Figure 9B:
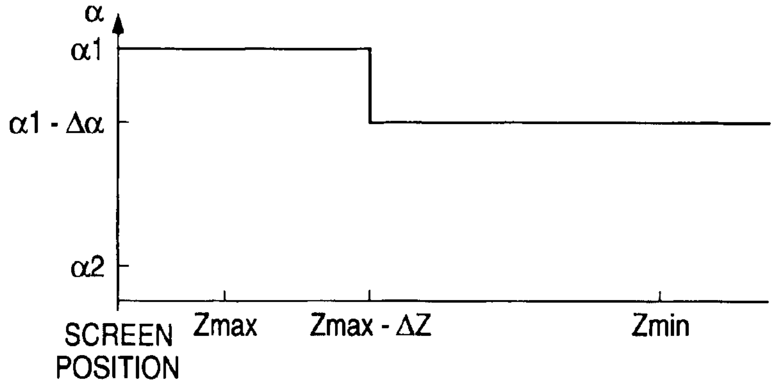
Figure 9C:
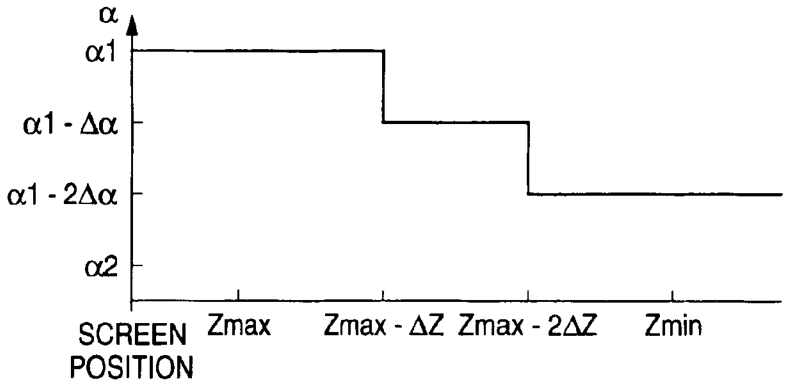
Figure 9D:
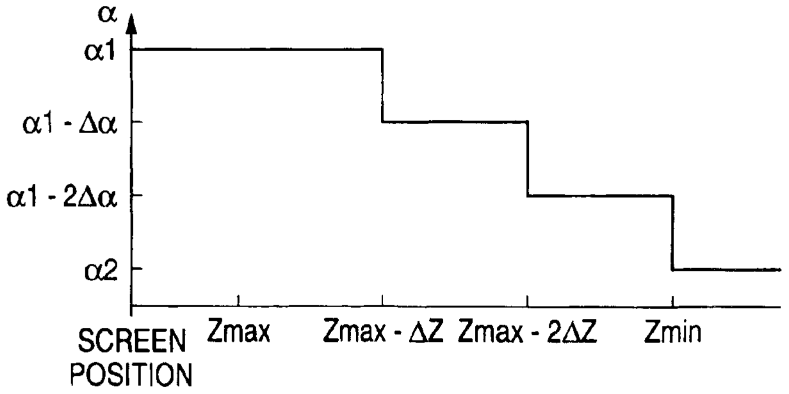

FIGS. 9A–9D show an example of how α values are set based on type-A filter data. Where N is equal to 4, for example, in the first writing operation, α1 is written as uα values of all pixels as shown in FIG. 9A. In the second writing operation, as shown in FIG. 9B, α1−Δα is written as α values of pixels having Z values that are smaller than or equal to Zmax−ΔZ. In the third writing operation, as shown in FIG. 9C, α1−2Δα is written as α values of pixels having Z values that are smaller than or equal to Zmax−2ΔZ. In the fourth writing operation, as shown in FIG. 9D, α1−3Δα=α2 is written as α values of pixels having Z values that are smaller than or equal to Zmax−3ΔZ=Zmin. Then, n is incremented to 5 at step S214. Since the relationship n>N is satisfied, the process goes to step S218.

On the other hand, if it is judged at step S204 that the filter type is B, at step S220 one unselected data pair is selected from the data pairs of a Z value and an α value that are contained in the selected filter data. At this time, a data pair having a greater Z value is selected preferentially. If the data pairs are sorted in descending order of the Z value, the operation selects the data pairs in order from the head.

Assume that the selected data pair is (Zs, αs). At step S222, the α value (=αs) of the selected data pair is written to the frame buffer (the frame buffer 45*a* or 45*b* shown in FIG. 3) as α values of pixels of the original image that have Z values smaller than or equal to the Z value (=Zs) of the selected data pair. That is, the α values of objects at positions that are the same as or deeper than the position indicated by Zs in the virtual three-dimensional space are set at αs uniformly. Pixels having Z values that are smaller than or equal to Zs can be determined by referring to the Z value buffer 46 of the VRAM 44.

At step S224, it is judged whether there remains an unselected data pair. If it is judged that there remains an unselected data pair (yes at step S224), the process returns to step S220, where another data pair is selected. An α value writing operation is performed by using the selected data pair. In this manner, steps S220–S224 are repeatedly performed until all the data pairs contained in the filter data are used. On the other hand, if it is judged that no unselected data pair remains (no at step S224), the process goes to step S218. The setting of α values based on the type-B filter data is performed in the above-described manner.

If first-selected filter data is of type B, a Z value to be used for writing an α value for the entire original image is set in a first-selected data pair of the first-selected filter data. By setting, as a Z value of such a data pair, a value (i.e., the Z value of the screen) indicating the position closest to the viewer's side among the depth values in the original image, an α value writing operation based on the data pair can be performed for the entire original image.

Figure 10A:
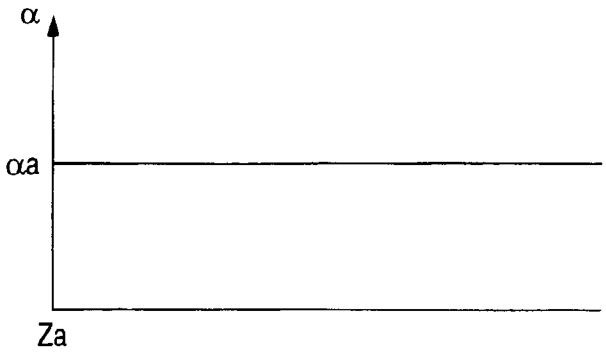
FIGS. 10A–10D show an example of how α values are set in accordance with Z values based on type-B filter data.
Figure 10B:
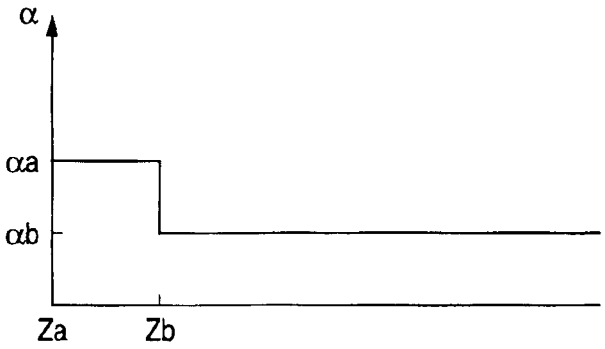
Figure 10C:
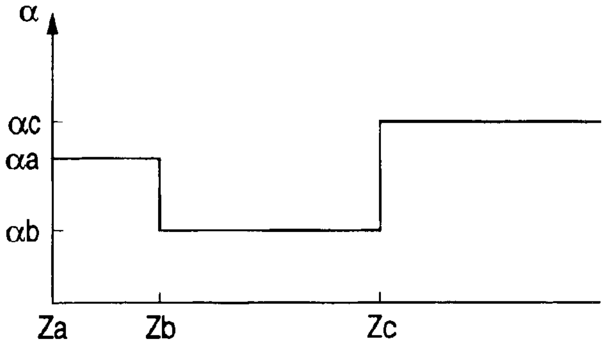
Figure 10D:
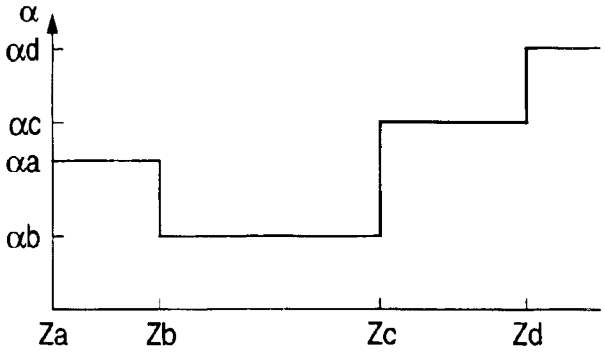

FIGS. 10A–10D show an example of how α values are set based on type-B filter data. The example of FIGS. 10A–10D is such that type-B filter data consisting of (Za, αa), (Zb, αb), (Zc, αc), and (Zd, αd) where Za>Zb>Zc>Zd is stored in the use filter area 16$c_1$. If this filter data is selected at step S202, the data pair (Za, αa) having the greatest Z value is selected first at step S220. As shown in FIG. 10A, at step S222, αa is written to the frame buffer 45 where the original image is stored as α values of pixels of the original image that have Z values smaller than or equal to Za. In the second writing operation, as shown in FIG. 10B, the data pair (Zb, αb) is selected and αb is written as α values of pixels having Z values that are smaller than or equal to Zb. In the third writing operation, as shown in FIG. 10C, the data pair (Zc, αc) is selected and αc is written as α values of pixels having Z values that are smaller than or equal to Zc. In the fourth writing operation, as shown in FIG. 10D, the data pair (Zd, αd) is selected and αd is written as α values of pixels having Z values that are smaller than or equal to Zd. Since all the data pairs have been selected now, the process goes to step S218.

Although α values are handled as values in a range of 0 to 1 in the filtering process described below, they are written as integers in a range of 0 to 128 to the frame buffers 45*a* and 45*b*.

After the execution of the α value writing operation using one type-A or type-B filter, it is judged at step S218 whether all the filter data contained in the use filter area 16$c_1$, have been selected. If it is judged that there remains unselected filter data (no at step S218), the process returns to step S202. In this manner, steps S202-S224 are repeatedly executed until α value writing operations are performed by using all the filter data contained in the use filter area 16$c_1$. On the other hand, if it is judged that all the filter data have been selected (yes at step S218), the filtering process (step S300 in FIG. 7) is executed, whereby a visual effect is imparted to the original image in degrees corresponding to the α values thus set. The filtering process will be described later in detail.

The use of type-A filter data is convenient for a person who develops a program, because a stepwise visual effect depending on the depth can be attained by merely specifying maximum and minimum Z values, α values corresponding to those Z values, and the number N of filters. On the other hand, the use of type-B filter data provides an advantage that α values can be set more flexibly and in a more detailed manner than in the case of using type-A filter data.

As described above, selection from the filter data contained in the use filter area 16$c_1$ (step S202) is performed in such a manner that filter data having greater Z values, that is, to be applied to a region closer to the viewer's side, is selected preferentially. The filter data may be sorted in the use filter area 16$c_1$ so that filter data having greater Z values is selected earlier. In this case, α value writing operations can be performed in descending order of the Z value by selecting the file data in order from the head.

Figures 11A, 11B:
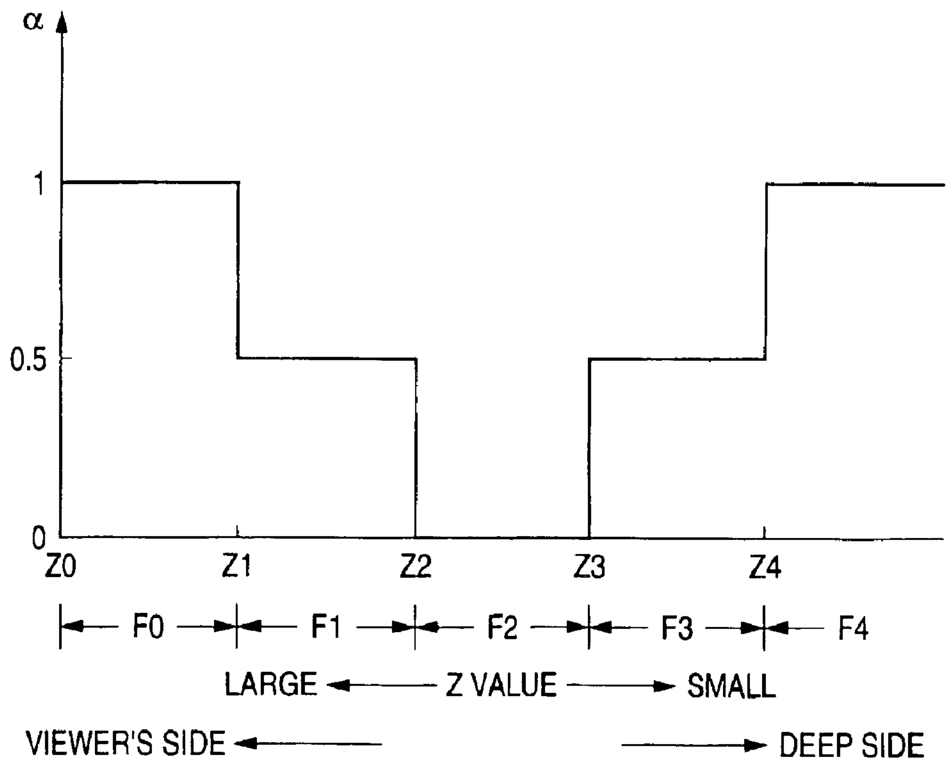
FIG. 11A is a table showing example filter data.
FIG. 11B is a graph showing an α value distribution of the filter data of FIG. 11A.

For example, the division into regions and the distribution of α values shown in FIGS. 1A and 1B can be realized by using type-B filter data B10 shown in FIG. 11A. According to the filter data B10, as shown in FIG. 11B, the α value is set at 1, 0.5, 0, 0.5, and 1 for the regions F0, F1, F2, F3, and F4, respectively.

Other filter data may be used to realize the α value distribution of FIG. 1B. FIGS. 12A–12D and FIGS. 13A–13D show other examples of filter data and manners of division into regions in the virtual three-dimensional space that realize the α value distribution of FIG. 1B.

In the example of FIGS. 12A–12D, two type-A filters A10 and A11 shown in FIGS. 12A and 12B, respectively, are used. FIG. 12C shows a manner of division into regions in the virtual three-dimensional space that is performed by the filters A10 and A11. FIG. 12D shows, along the depth, an α value distribution that is realized by the filters A10 and A11. In this example, the scene is divided into nine regions F10–F18 and various α values are set for the respective regions. For the regions F10–F14, α values are set based on the file data A10. For the regions F15–F18, α values are set based on the file data A11. Since the file data A10 has greater Z values than the filter data A11, the file data A10 is processed first and the filter data A11 is then processed.

In the example of FIGS. 13A–13D, type-A data A20 shown in FIG. 13A and type-B data B20 shown in FIG. 13B are used. FIG. 13C shows a manner of division into regions in the virtual three-dimensional space that is performed by the filters A20 and B20. FIG. 13D shows, along the depth, an α value distribution that is realized by the filters A20 and B20. In this example, the scene is divided into five regions F20–F24 and various α values are set for the respective regions. For the regions F20–F22, α values are set based on the file data A20. For the regions F23 and F24, α values are set based on the file data B20. Since the file data A20 has greater Z values than the filter data B20, the file data A20 is processed first and the filter data B20 is then processed.

Returning to FIG. 7, after completion of the α value writing process (step S200), the filtering process (step S300) is executed by using the α values thus set. Several examples of the filtering process will be described below.

Figure 14:
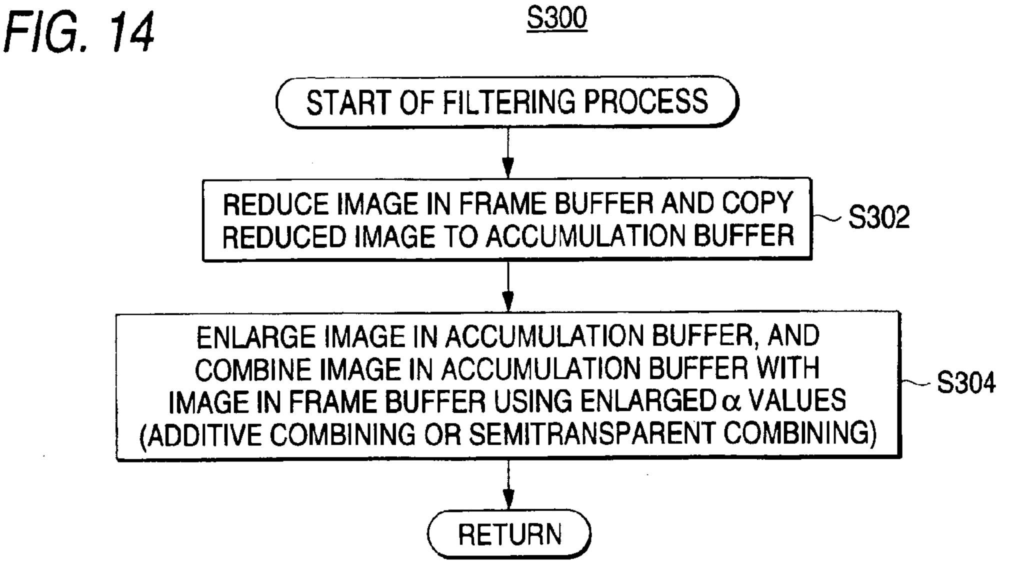
FIG. 14 is a flowchart showing a first example of a blurring filtering process.

FIG. 14 is a flowchart showing a first technique of blurring filtering as an example of the filtering process S300. At step S302, an original image stored in the frame buffer 45*a* or 45*b* is reduced and then copied to the accumulation buffer 47. At this time, calculations for reduction are performed on individual lightness values of R, G, and B and the same calculations are performed on an α value. Bilinear filtering is performed on each of the lightness of values of R, G, and B and the α value. For example, when an original image of 640×480 pixels is reduced into an image of 320×240 pixels, lightness values of R, G, and B and an α value are stored in the accumulation buffer for each of the 320×240 pixels.

At step S304, the image in the accumulation buffer 47 is enlarged to the same size as of the original image and an enlarged image is combined with the original image in the frame buffer 45 by using enlarged α values. When the image is enlarged, calculations for enlargement are performed on individual lightness values of R, G, and B and an α value. At this time, bilinear filtering is performed as in the case of the reduction. An image obtained by blurring the original image as a whole is generated by performing bilinear filtering at the time of image reduction and enlargement. In this example, the blurred image is used as a filtered image for imparting a blurring effect to the original image.

The combining of the filtered image and the original image is performed by additive combining or semitransparent combining. In the case of additive combining, the following Equation (a) is used:

$$Pd1=Pd0+Ps\times\alpha \quad (a)$$

where

Ps: lightness of a writing source pixel (0 to 1)

Pd0: pre-writing lightness of a writing destination pixel (0 to 1)

Pd1: post-writing lightness of the writing destination pixel (0 to 1).

In this example, the writing source pixel is a pixel of the image (filtered image) obtained by enlarging the image in the accumulation buffer 47 and the writing destination pixel is a pixel of the original image in the frame buffer 45*a* or 45*b*. Although the lightness of a pixel stored in the frame buffer 45*a* or 45*b* or the accumulation buffer 47 is an integer in a range of 0 to 255, at the time of combining it is normalized so as to have a value in a range of 0 to 1. As described above, the parameter α in Equation (a) is a value obtained by performing the calculation for enlargement on an α value stored in the accumulation buffer 47. Although an α value stored in the accumulation buffer 47 is an integer in a range of 0 to 128, at the time of combining it is normalized so as to have a value in a range of 0 to 1. Therefore, α also takes a value in a range of 0 to 1 when it is subjected to the calculation for combining.

On the other hand, in the case of semitransparent combining, the following Equation (b) is used:

$$Pd1=Pd0\times(1-\alpha)+Ps\times\alpha \quad (b)$$

where Ps, Pd0, and Pd1 are defined in the same manner as in Equation (a). Also in Equation (b), the parameter α is a value obtained by performing the calculation for enlargement on an α value stored in the accumulation buffer 47 and takes a value in a range of 0 to 1.

Pd1 values calculated for the respective pixels according to Equation (a) or (b) are written to the frame buffer 45 in which the original image is stored, whereby an image obtained by combining the blurred filtered image with the original image is generated in the frame buffer 45. The calculations and writing are performed for each of R, G, and B.

As described above, α values that indicate the combining ratio between an original image and a blurred filtered image are set so as to be correlated with Z values that represent depths in a virtual three-dimensional space. Therefore, it is possible to impart stepwise various degrees of blurring effect depending on the depth to a composed image. That is, according to this example, varied degrees of blurring effect can be imparted to multiple regions obtained by dividing a scene in a virtual three-dimensional space in accordance with the depth.

As described above, according to this example, a uniform calculation using a common α value is performed on the multiple pixels belonging to the same region and only the α value and two pixel values are used in the calculation. Therefore, stepwise blurring effects depending on the depth can be realized by relatively simple processing.

Figure 15:
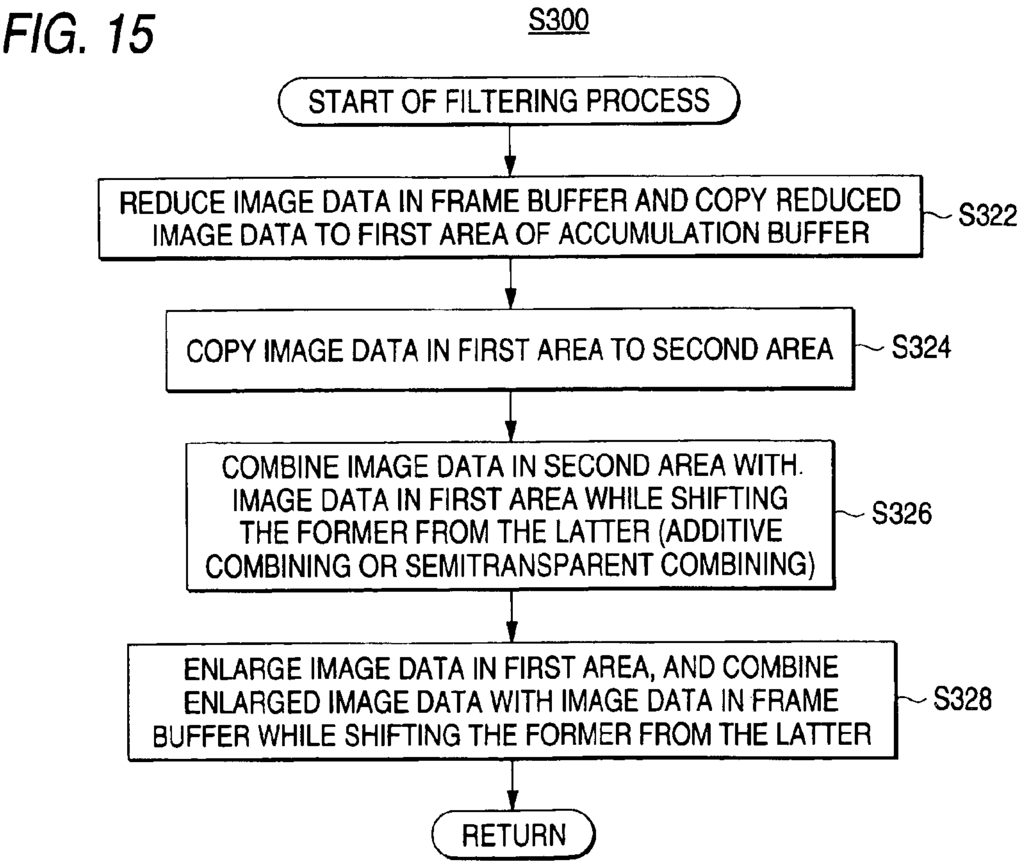
FIG. 15 is a flowchart showing a second example of the blurring filtering process.

FIG. 15 is a flowchart showing a second technique of blurring filtering as another example of the filtering process S300. At step S322, an original image stored in the frame buffer 45*a* or 45*b* is reduced and then copied to the accumulation buffer 47. This is the same as in the first technique of blurring filtering.

Figure 16:
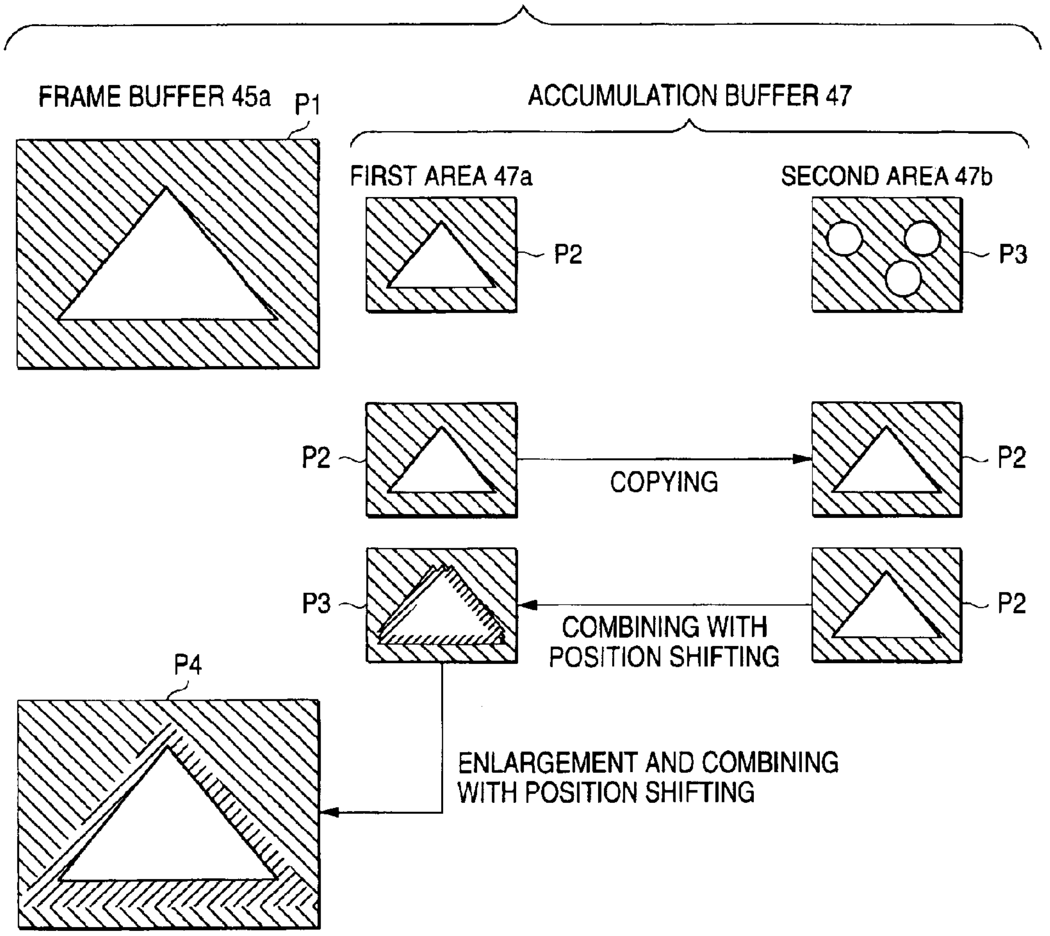
FIG. 16 shows an example of the storage contents of a frame buffer and an accumulation buffer during the course of the filtering process of FIG. 15.

FIG. 16 shows images that are stored in the frame buffer 45*a* or 45*b* and the accumulation buffer 47 during the course of this blurring filtering. In this filtering process, a first area 47*a* and a second area 47*b* are secured in the accumulation buffer 47. Assume that as shown in FIG. 16 original image data P1 is stored in the frame buffer 45*a*. As a result of execution of step S322, reduced image data P2 of the original image data P1 is stored in the first area 47*a* of the accumulation buffer 47. It is assumed that, on the other hand, another image P3 that was written previously is stored in the second area 47*b*. As in the case of step S302 in FIG. 14, at step S322 calculations for reduction are performed on lightness values of each of R, G, and B and the same calculations are performed on α values. Bilinear filtering is also performed at this time.

At step S324, the image data in the first area 47*a* is copied to the second area 47*b*. As a result, the same image data P2 is stored in the first area 47*a* and the second area 47*b*.

At step S326, the image data in the second area 47*b* is combined with the image data in the first area 47*a* while being shifted from the latter. This combining may be either additive combining or semitransparent combining. Alpha values used in the combining are not the α values contained in the image data stored in the first area 47*a* or the second area 47*b* but are a preset, fixed value αc (e.g., 0.5) in a range of 0 to 1. That is, the following Equation (c) is used in the case of additive combining:

$$Pd1=Pd0+Ps\times\alpha c. \quad (c)$$

In the case of semitransparent combining, the following Equation (d) is used:

$$Pd1=Pd0\times(1-\alpha c)+Ps\times\alpha c \quad (d)$$

where

Ps: lightness of a writing source pixel (0 to 1)

Pd0: pre-writing lightness of a writing destination pixel (0 to 1)

Pd1: post-writing lightness of the writing destination pixel (0 to 1)

αc: fixed value that is independent of the Z value.

In this example, the writing source is the second area 47*b* and the writing destination is the first area 47*a*. Although the lightness of a pixel stored in the area 47*a* or 47*b* is an integer in a range of 0 to 255, at the time of combining it is normalized so as to have a value in a range of 0 to 1. It is noted that the combining does not change the α values stored in the first area 47*a*.

Figure 17A:
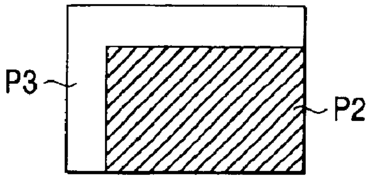
FIGS. 17A–17H show a method of combining two images while shifting the images relative to each other.
Figure 17B:
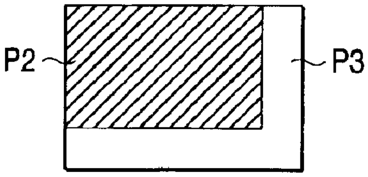

Various manners of shifting two images from each other are possible. For example, the image data in the second area 47*b* may be shifted from the image data in the first area 47*a* to the bottom-right side (FIG. 17A), to the top-left side (FIG.

Figure 17C:
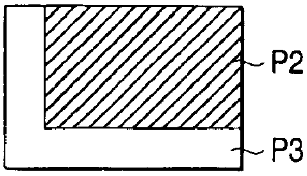
Figure 17D:
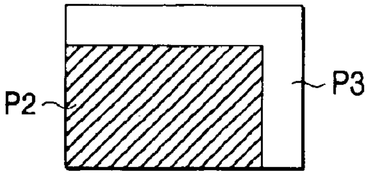
Figure 17E:
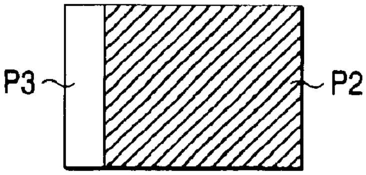
Figure 17F:
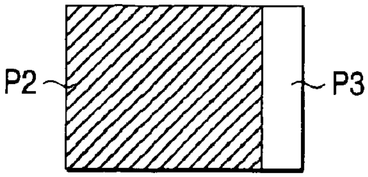
Figure 17G:
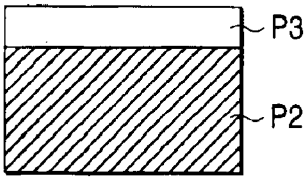
Figure 17H:
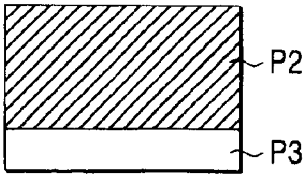

17B), to the top-right side (FIG. 17C), to the bottom-left side (FIG. 17D), rightward (FIG. 17E), leftward (FIG. 17F), downward (FIG. 17G), or upward (FIG. 17H) by a prescribed distance. Combining with position shifting may be performed multiple times. For example, it is possible to perform combining four times while shifting the image data in the second area 47*b* in the four diagonal directions (FIGS. 17A to 17D) or perform combining four times while shifting the image data in the second area 47*b* rightward, leftward, upward, and downward (FIGS. 17E to 17H) in addition to the above four times of combining with diagonal shifting (eight times of combining in total).

At step S328, the image data P4 in the first area 47*a* is enlarged to so as to have the size of the original image data P1 and is then combined with the original image data P1 in the frame buffer 45*a* while being shifted from the latter. Composed image data P4 is stored in the frame buffer 45*a*. When the image is enlarged, calculations for enlargement are performed on lightness values of each of R, G, and B and α values. Bilinear filtering is performed at this time in the same manner as at the time of reduction. Since bilinear filtering is performed at the time of each of image reduction and enlargement and shifting is performed at step S326, an image obtained by blurring the original image as a whole is generated after the enlargement at step S328. In this example, the blurred image is used as a filtered image to be used for imparting a blurring effect to the original image. The blurring effect is enhanced by combining the filtered image with the original image while further shifting the former from the latter. This shifting can be performed in the same manner as at step S326.

The combining of the blurred filtered image and the original image may be additive combining that uses Equation (a) or semitransparent combining that uses Equation (b). Alpha values used for the combining are values obtained by performing calculations for enlargement on the α values stored in the first area 47*a*. Pd1 values calculated for the respective pixels according to Equation (a) or (b) are written to the frame buffer 45*a* or 45*b* in which the original image is stored, whereby an image obtained by combining the blurred filtered image with the original image is generated in the frame buffer 45*a* or 45*b*. The calculations and writing are performed for each of R, G, and B.

Alpha values that indicate the combining ratio are set so as to be correlated with Z values that represent depths in a virtual three-dimensional space. Therefore, it is possible to impart various degrees of blurring effect depending on the depth of a composed image. That is, also according to this example, varied degrees of blurring effect can be imparted to multiple regions obtained by dividing a scene in a virtual three-dimensional space in accordance with the depth.

Also according to this example, a uniform calculation using a common α value is performed on the multiple pixels belonging to the same region and only the α value and two pixel values are used in the calculation. Therefore, stepwise blurring effects depending on the depth can be realized by relatively simple processing.

Figure 18:
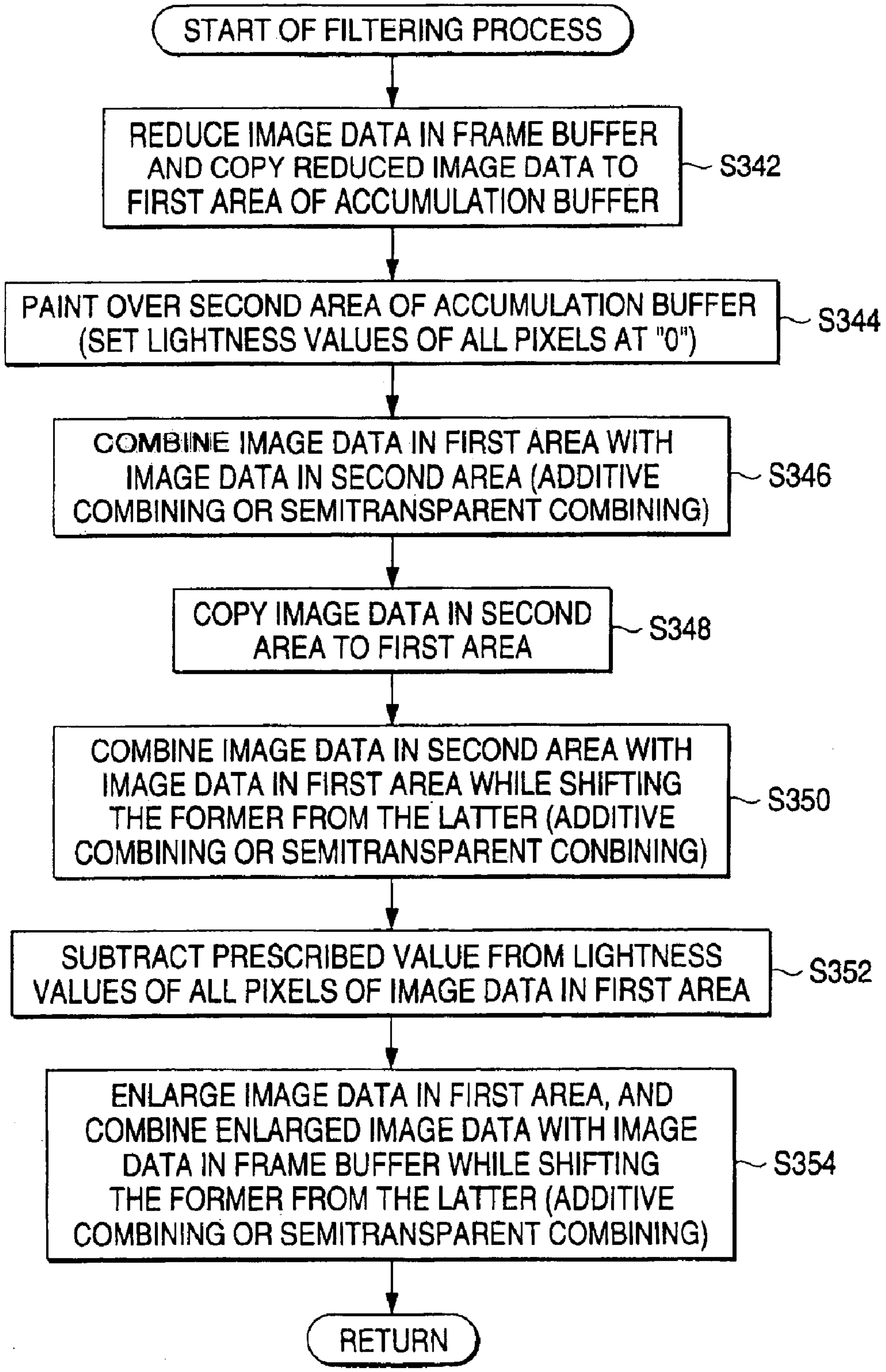
FIG. 18 is a flowchart showing an example diffuse glow filtering process.
Figure 19:
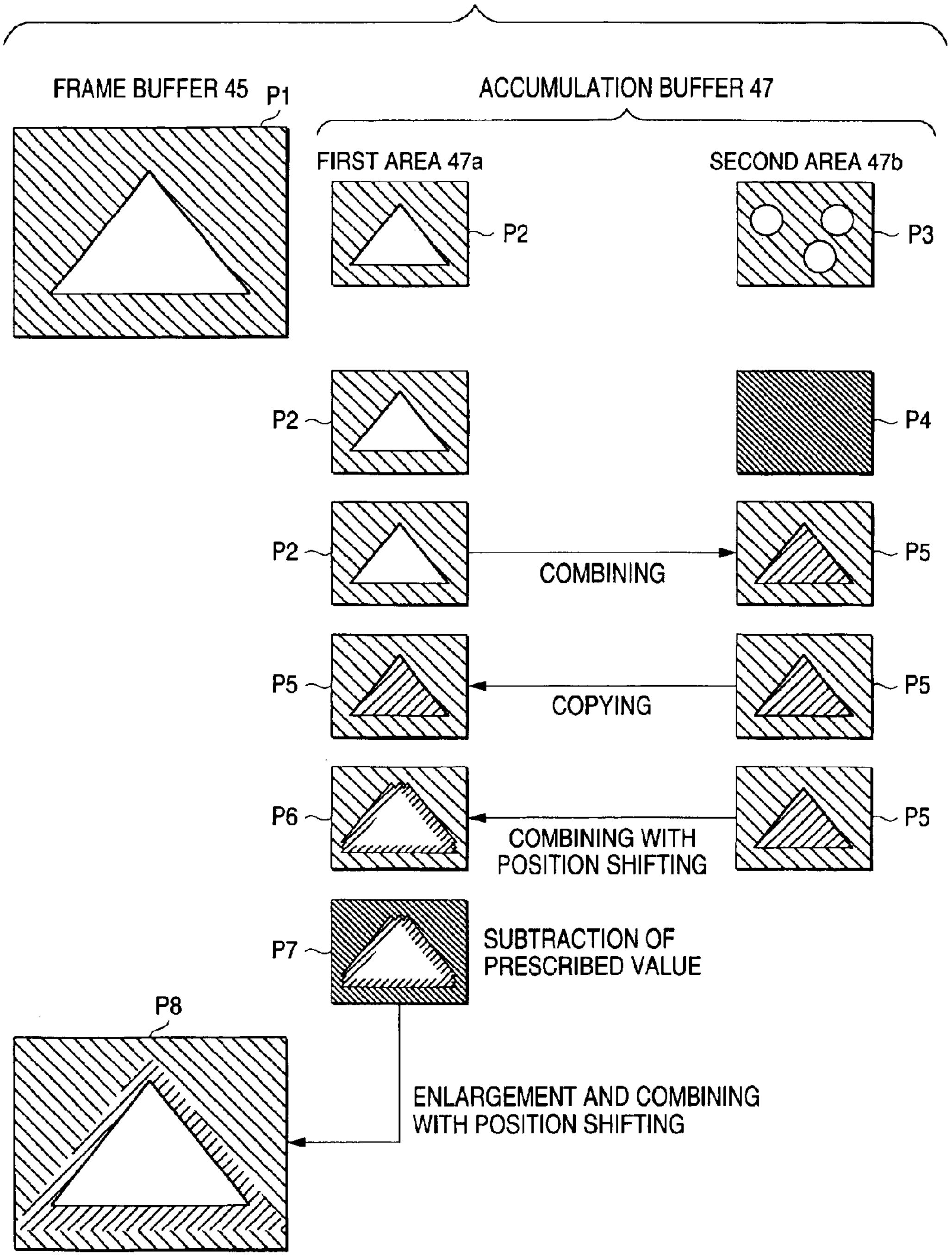
FIG. 19 shows an example of the storage contents of a frame buffer and an accumulation buffer during the course of the filtering process of FIG. 18.

FIG. 18 is an exemplary flowchart showing a diffuse glow filtering technique. FIG. 19 shows images that are stored in the frame buffer 45 and the accumulation buffer 47 during the course of the diffuse glow filtering process. The diffuse glow process, which is also called a soft focusing process, is a process in which light is spread around a bright object in a state that focusing occurs on a target object.

In this filtering process, first, at step S342, an original image that is stored in the frame buffer 45*a* or 45*b* is reduced and then copied to a first area 47*a* of the accumulation buffer 47 by using a bilinear filter. This is the same as step S322 in FIG. 15.

At step S344, a second area 47*b* of the accumulation buffer 47 is "painted over." That is, the lightness values of the R, G, and B components of all the pixels of image data P3 in the second area 47*b* are made 0. As a result, the image data P3 that was used previously and remains in the second area 47*b* is erased and image data P4 in which the lightness values of all the pixels are 0 is generated in the second area 47*b*.

At step S346, the image data P2 in the first area 47*a* is combined with the image data P4 in the second area 47*b*. Alpha values used in the combining are not the α values contained in the image data P2 stored in the first area 47*a* but are a preset, fixed value αc (e.g., 0.5) in a range of 0 to 1. Since the lightness values of the writing destination pixels are 0, additive combining and semitransparent combining produce the same result. That is, $$Pd1=Ps\times\alpha c \qquad \text{(e)}$$

where

Ps: lightness of a writing source pixel (0 to 1)

Pd1: post-writing lightness of a writing destination pixel (0 to 1)

αc: fixed value that is independent of the Z value.

The writing source is the first area 47*a* and the writing destination is the second area 47*b*. Therefore, as a result of the execution of step S346, image data P5 having lightness values obtained by multiplying the lightness values of the image data P2 in the first area 47*a* by αc for the respective R, G, and B components is generated in the second area 47*b*. Since the α value data in the first area 47*a* is copied to the second area 47*b*, the image data P5 in the second area 47*b* has the same α values as the image data P2 in the first area 47*a*.

At step S348, the image data P2 in the second area 47*b* is copied to the first area 47*a*. As a result, the same image data P5 is stored in the first area 47*a* and the second area 47*b*.

At step S350, the image data P5 in the second area 47*b* is combined with the image data P5 in the first area 47*a* while being shifted from the latter and a composed image data P6 is stored in the first area 47*a*. This processing is the same as the processing performed at step S326 in FIG. 15.

At step S352, a prescribed value is subtracted from the lightness values of the R, G, and B components of all the pixels of the image data in the first area 47*a*. This subtraction is expressed by the following Equation (f):

$$Pd1=Pd0-C \qquad \text{(f)}$$

where

C: prescribed lightness value (0 to 1)

Pd0: pre-writing lightness of a writing destination pixel (0 to 1)

Pd1: post-writing lightness of the writing destination pixel (0 to 1).

In this example, the writing destination is the first area 47*a*. If Pd1 becomes a negative value, it will be regarded as 0 in the subsequent processing. In this subtraction, the α values stored in the first area 47*a* do not vary.

As a result of the execution of step S352, in the first area 47*a*, the lightness values of pixels that were smaller than the prescribed value are changed to 0 and only image portions whose lightness values were greater than or equal to the prescribed value remain. By setting the subtrahend C to a proper value, image data P7 in which there remain only objects having relatively large lightness values and their peripheral portions generated by the shifted combining of step S350 can be generated in the first area 47*a*.

At step S354, the image data in the first area 47*a* is enlarged to so as to have the size of the original image data and is then combined with the original image data in the frame buffer 45*a* or 45*b* while being shifted from the latter. A composed image is stored in the frame buffer 45*a* or 45*b*. This is the same as step S328 in FIG. 15. As a result of the execution of the shifting at step S350 and the subtraction at step S352, an image is generated in which portions of the original image whose lightness values were greater than the prescribed value come to have even greater lightness values and portions having relatively large lightness values though they are smaller than the lightness values of the above high-lightness portions are formed around the above high-lightness portions. The image to the whole of which the above-described diffuse glow effect is imparted is a filtered image to be applied to the original image in this example. At step S354, the filtered image is combined with the original image while being shifted from the latter, which enhances the diffuse glow effect. This shifting can be performed in the same manner as in step S326 in FIG. 15.

The combining of the diffuse glow filtered image and the original image may be additive combining that uses Equation (a) or semitransparent combining that uses Equation (b). Alpha values used for the combining are values obtained by performing calculations for enlargement on the α values stored in the first area 47*a*. Pd1 values calculated for the respective pixels according to Equation (a) or (b) are written to the frame buffer 45 in which the original image is stored, whereby an image P8 obtained by combining the diffuse glow filtered image with the original image is generated in the frame buffer 45. The calculations and writing are performed for each of R, G, and B. As a result, a diffuse glow effect is attained in which portions around relatively bright portions of the image shine dimly.

Alpha values that indicate the combining ratio are set so as to be correlated with Z values that represent depths in a virtual three-dimensional space. Therefore, it is possible to impart various degrees of diffuse glow effect depending on the depth of a composed image. That is, according to this example, varied degrees of diffuse glow effect can be imparted to multiple regions obtained by dividing a scene in a virtual three-dimensional space in accordance with the depth.

According to this example, a uniform calculation using a common α value is performed on the multiple pixels belonging to the same region and only the α value and two pixel values are used in the calculation. Therefore, stepwise diffuse glow effects depending on the depth can be realized by relatively simple processing.

Figure 20:
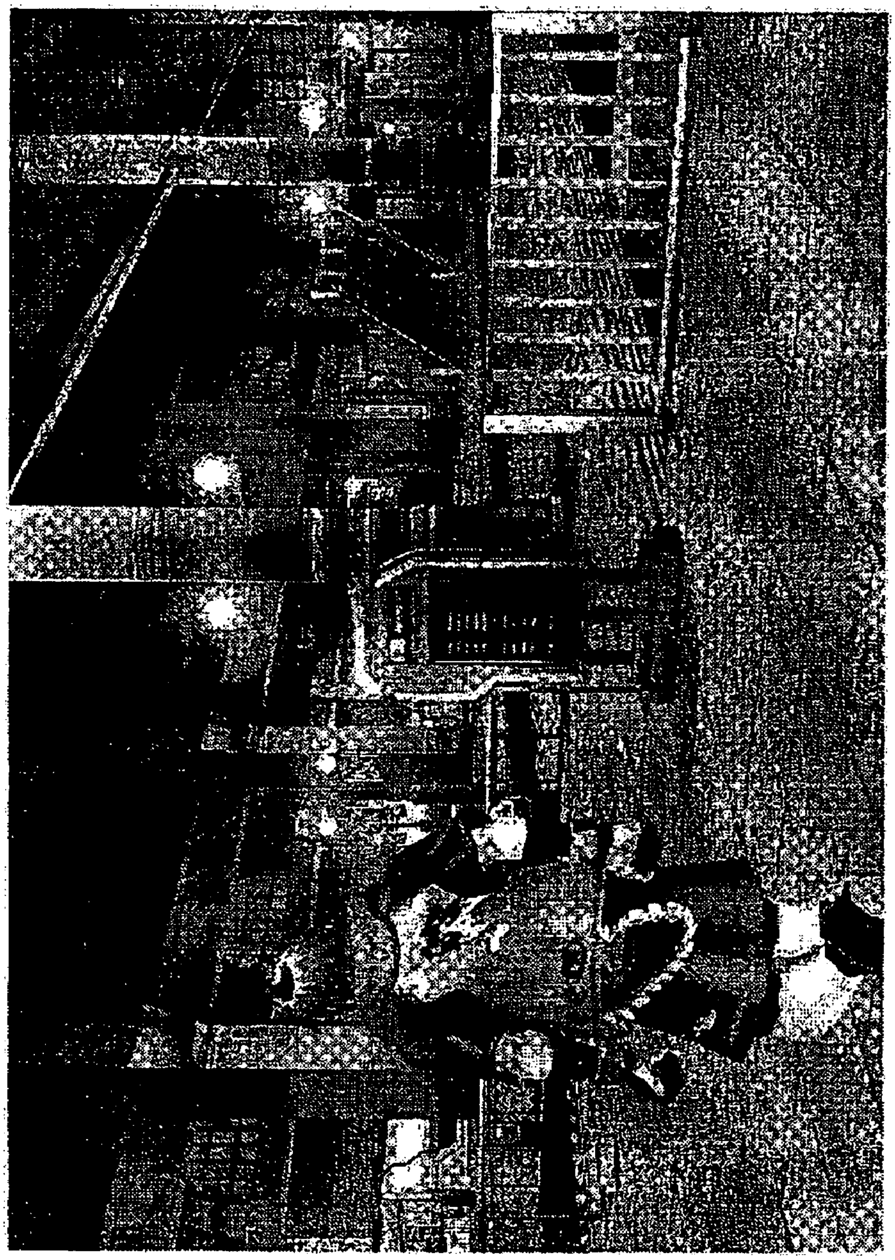
FIG. 20 shows an example game picture as an original image.
Figure 21:
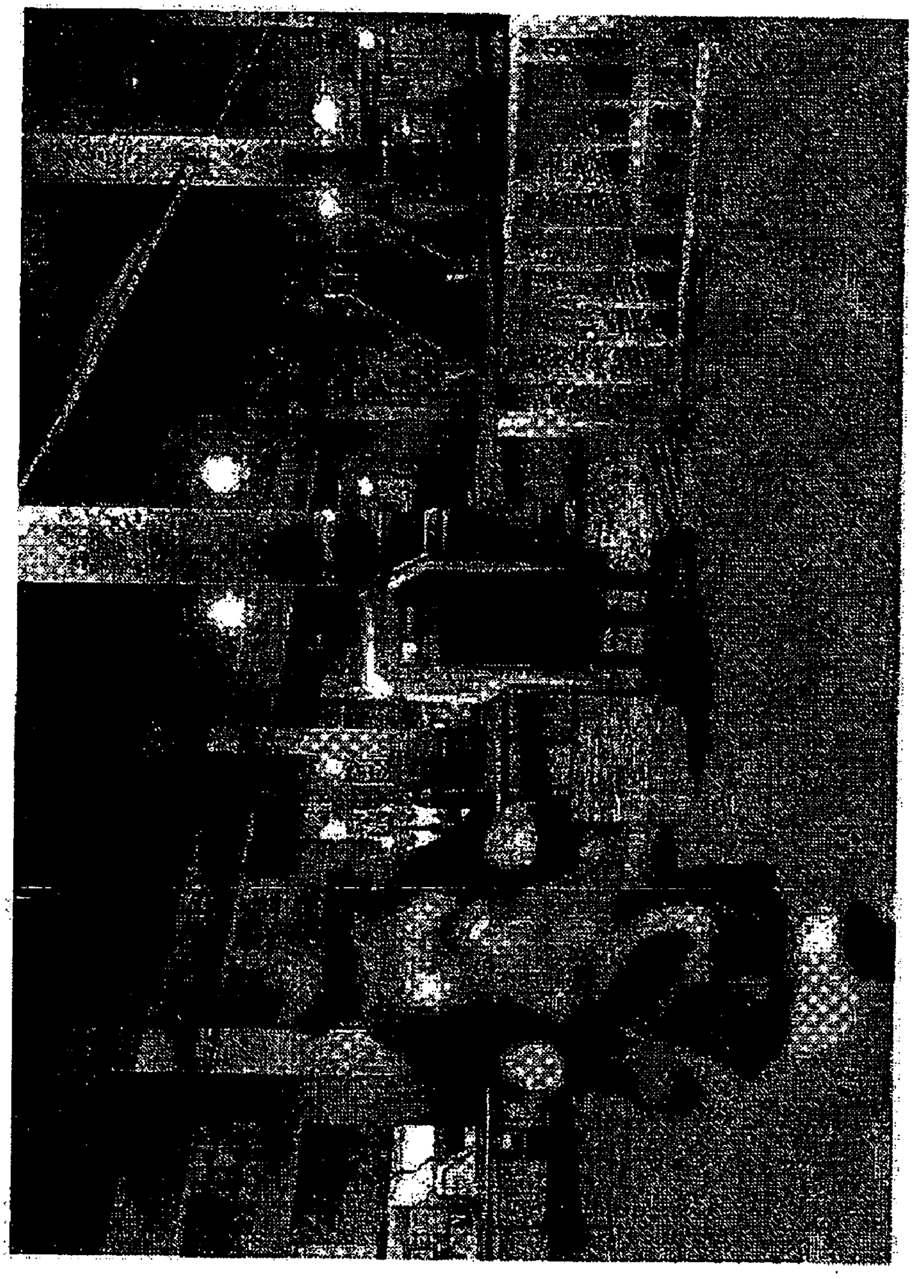
FIG. 21 shows an example game picture produced by performing blurring filtering.
Figure 22:
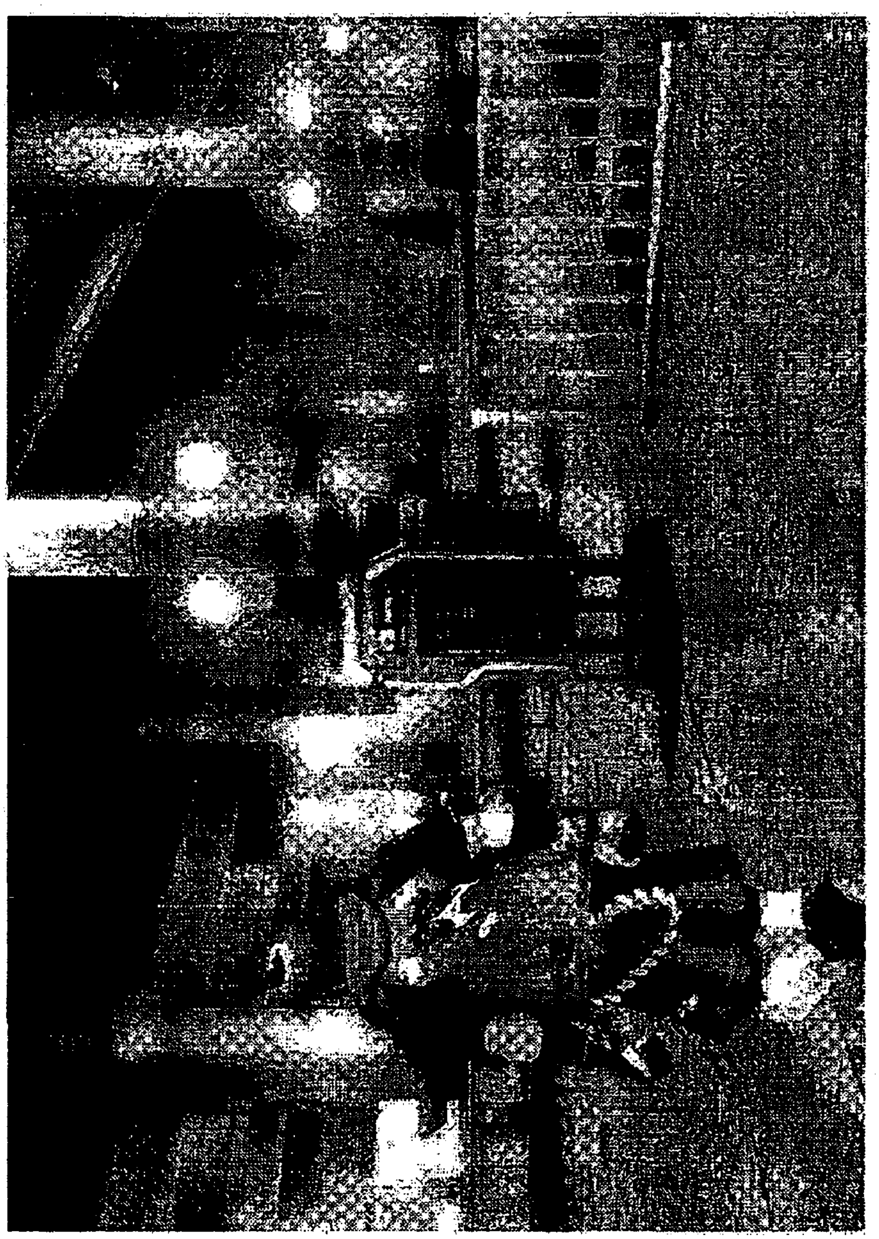
FIG. 22 shows an example game picture produced by performing diffuse glow filtering.

FIGS. 20–22 show examples of actual game pictures. Specifically, FIG. 20 shows an example original image to be subjected to filtering processing. FIG. 21 shows an example game picture generated by using the above-described first technique (FIG. 14) of blurring filtering. FIG. 22 shows an example game picture generated by using the above-described diffuse glow filtering (FIG. 18).

In generating the game picture of FIG. 21, the following type-A filter data was used:

Zmax=35,397, Zmin=14,519,

α1=1 (128), α2=0, N=8.

The image of FIG. 21 in which a region on the viewer's side is blurred was generated by writing α values using the above filter data and then performing blurring filtering. This is due to the facts that α values that are the degrees of opaqueness of a filtered image are large in a region on the viewer's side and are small in a deep region. It is seen that as thus exemplified the α value determines the degree of influence of visual effect on a scene.

In generating the game picture of FIG. 22, the following type-A filter data was used:

Zmax=21,609, Zmin=7,387,

α1=0, α2=1(128), N=8.

As shown in FIG. 22, a diffuse glow effect was imparted on objects at deep positions in the virtual three-dimensional space by writing α values using the above filter data and then performing diffuse glow filtering. Specifically, the diffuse glow effect is remarkable for the lights located at relatively deep positions in the virtual three-dimensional space and it is almost negligible for the game character located at a position relatively close to the viewer's side (even for its portions having large lightness values such as the white portions of its clothes). This is due to the facts that α values are large in a region on the viewer's side and are small in a deep region.

The invention has been described above with reference to preferred embodiments. However, the invention is not limited to the above embodiments and various modifications are possible without departing from the substance of the invention. For example, the order of the multiple steps of each method according to the invention can be changed without departing from the spirit and scope of the invention.

Although in the above embodiments the invention was described in connection with the home game machine, the invention can also be applied to general-purpose computers such as personal computers, arcade game machines, etc.

Although in the above embodiments the control device is separated from the display device and the input device, the invention can also be applied to video game machines in which the control device is integrated with the display device and the input device.

In the above embodiments, a CD-ROM is used as the computer-readable recording medium on which to record game software. However, the recording medium is not limited to the CD-ROM and may be any of the semiconductor memory and other computer-readable magnetic or optical recording media such as the DVD (digital versatile disc) and the ROM card. Further, a program and data for implementing the invention may be provided in such a manner as to be pre-installed in the storage device of a game machine or a computer.

A program and data for implementing the invention may be used after being downloaded to the HDD 18 from the communication network 38 that is connected to the communication interface 28 via the communication line 42 (see FIG. 2). It is also possible to record such a program and data in advance in the memory of another apparatus connected to the communication line 42 and to use those when necessary by reading those sequentially into the RAM 16 via the communication line 42.

As for the manner of providing a program and data for implementing the invention, they may be provided from an apparatus connected to the communication network 38 in the form of a computer data signal that is superimposed on a carrier wave. For example, the invention may be implemented in such a manner that the game machine main body 10 requests, from the communication interface 28, via the communication line 42, another apparatus connected to the communication network 38 to send a computer data signal, receives it, and stores it in the RAM 16.

According to the invention, a single filtering level is determined for each of regions obtained by dividing a scene in a virtual three-dimensional space in accordance with the distance in the depth direction and calculations are performed under common conditions on the pixels belonging to each region. Therefore, filtering that imparts, to the scene, a visual effect that depends on the distance in the depth direction can be performed by simple processing.

What is claimed is:

1. A computer-readable recording medium on which a game program for displaying a scene in a virtual three-dimensional space on a screen is recorded, the game program causing a computer to execute a process comprising:

dividing the scene into a plurality of regions in accordance with distances from a prescribed viewing point in a depth direction, the regions including at least a close region that is closest to the viewing point, a far region that is furthest from the viewing point, and a subject area region that is between the close region and the far region with respect to the viewing point;

setting filtering levels for the respective divisional regions;

performing filtering processing that imparts visual effects to respective regions of the scene in accordance with respective set filtering levels so that the close region and the far region are affected more than the subject area region; and displaying a scene obtained by the filtering processing on the screen.

2. The recording medium according to claim 1, wherein a rule for division into the regions and filter data specifying the filtering levels that are set for the respective regions are further recorded on the recording medium, the program causing the computer to execute the process further comprising:

dividing the scene into the regions according to the division rule;

setting the filtering levels specified by the filter data for the respective divisional regions;

storing, in a first storage device, each of the filtering levels that is set for an associated divisional region so as to be correlated with pixels belonging to the associated divisional region;

storing pixel data of a scene obtained by the filtering processing in a second storage device;

reading the pixel data from the second storage device; and sending the pixel data to a display device.

3. The recording medium according to claim 1, wherein the setting further comprises setting the filtering levels so that a filtering level for a region closer to the viewing point is set earlier.

4. The recording medium according to claim 1, wherein the performing filtering processing further comprises generating a filtered scene by imparting a uniform visual effect to an original scene as a whole and combining the filtered scene with the original scene at a ratio corresponding to each of the filtering levels set for the respective regions.

5. The recording medium according to claim 1, wherein the original scene is defined by a two-dimensional original image generated by performing perspective projection on the scene with respect to the viewing point and information relating to the two-dimensional original image and indicating distances from the viewing point in the depth direction.

6. The recording medium according to claim 5, wherein the performing filtering processing further comprises generating a filtered image by imparting a uniform visual effect to the two-dimensional original image as a whole and combining the filtered image with the original image at a ratio corresponding to each of the filtering levels that are set for the respective regions.

7. The recording medium according to claim 4, wherein the filtering levels comprise degrees of opaqueness and the combining further comprises either additive combining or semitransparent combining using the degrees of opaqueness.

8. The recording medium according to claim 1, wherein the visual effects comprise either blurring effects or diffuse glow effects.

9. A video game program for displaying a scene in a virtual three-dimensional space on a screen, the game program causing a computer to execute a process comprising:

dividing the scene into a plurality of regions in accordance with distances from a prescribed viewing point in a depth direction, the regions including at least a close region that is closest to the viewing point, a far region that is furthest from the viewing point, and a subject area region that is between the close region and the far region with respect to the viewing point;

setting filtering levels for respective divisional regions;

performing filtering processing that imparts visual effects to the respective regions of the scene in accordance with the respective set filtering levels so that the close region and the far region are affected more than the subject area region; and displaying a scene obtained by the filtering processing on the screen.

10. A video game apparatus comprising:

a display device;

a computer-readable recording medium on which a program for displaying a scene in a virtual three-dimensional space on a screen of the display device is recorded; and a computer for reading the program from the recording medium and executing the program, the computer executing, by reading the program from the recording medium, a process comprising:

dividing the scene into a plurality of regions in accordance with distances from a prescribed viewing point in a depth direction, the regions including at least a close region that is closest to the viewing point, a far region that is furthest from the viewing point, and a subject area region that is between the close region and the far region with respect to the viewing point;

setting filtering levels for respective divisional regions;

performing filtering processing that imparts visual effects to the respective regions of the scene in accordance with the respective set filtering levels so that the close region and the far region are affected more than the subject area region; and displaying a scene obtained by the filtering processing on the screen.

11. A method for controlling a video game apparatus that comprises a computer and a display device and displays a scene in a virtual three-dimensional space on a screen of the display device, the method comprising:

dividing the scene into a plurality of regions in accordance with distances from a prescribed viewing point in a depth direction, the regions including at least a close region that is closest to the viewing point, a far region that is furthest from the viewing point, and a subject area region that is between the close region and the far region with respect to the viewing point;

setting filtering levels for respective divisional regions;

performing filtering processing that imparts visual effects to the respective regions of the scene in accordance with the respective set filtering levels so that the close region and the far region are affected more than the subject area region; and displaying a scene obtained by the filtering processing on the screen.

12. The method according to claim 11, wherein the setting further comprises setting filtering levels so that a filtering level for a region closer to the viewing point is set earlier.

13. The method according to claim 11, wherein the performing filtering processing further comprises generating a filtered scene by imparting a uniform visual effect to an original scene as a whole and combining the filtered scene with the original scene at a ratio corresponding to each of the filtering levels set for the respective regions.

14. The method according to claim 11, wherein the original scene is defined by a two-dimensional original image generated by performing perspective projection on the scene with respect to the viewing point and information relating to the two-dimensional original image and indicating distances from the viewing point in the depth direction.

15. The method according to claim 14, wherein the performing filtering processing further comprises generating a filtered image by imparting a uniform visual effect to the two-dimensional original image as a whole and combining the filtered image with the original image at a ratio corresponding to each of the filtering levels that are set for the respective regions.

16. The method according to claim 13, wherein the filtering levels comprise degrees of opaqueness and the combining further comprises either additive combining or semitransparent combining using the degrees of opaqueness.

17. The method according to claim 11, wherein the visual effects comprise either blurring effects or diffuse glow effects.

18. The method according to claim 15, wherein the filtering levels comprise degrees of opaqueness and the combining further comprises either additive combining or semitransparent combining using the degrees of opaqueness.

19. The recording medium according to claim 6, wherein the filtering levels comprise degrees of opaqueness and the combining further comprises either additive combining or semitransparent combining using the degrees of opaqueness.

* * * * *